United States Patent
Kim et al.

(10) Patent No.: US 10,937,314 B2
(45) Date of Patent: Mar. 2, 2021

(54) DRIVING ASSISTANCE APPARATUS FOR VEHICLE AND CONTROL METHOD THEREOF

(71) Applicant: LG ELECTRONICS INC., Seoul (KR)

(72) Inventors: Hansung Kim, Seoul (KR); Hyunho Ki, Seoul (KR); Suho Park, Seoul (KR); Jaeseung Bae, Seoul (KR); Jaehwan Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 54 days.

(21) Appl. No.: 16/129,594

(22) Filed: Sep. 12, 2018

(65) Prior Publication Data
US 2019/0077402 A1    Mar. 14, 2019

(30) Foreign Application Priority Data

Sep. 13, 2017  (KR) ......................... 10-2017-0117384

(51) Int. Cl.
  *G08G 1/0967*  (2006.01)
  *B60W 30/165*  (2020.01)
  (Continued)

(52) U.S. Cl.
  CPC ..... *G08G 1/096791* (2013.01); *B60W 30/0956* (2013.01); *B60W 30/10* (2013.01);
  (Continued)

(58) Field of Classification Search
  CPC .............. G08G 1/0965; G08G 1/09675; G08G 1/096791; G08G 1/161; G08G 1/162;
  (Continued)

(56) References Cited

U.S. PATENT DOCUMENTS 8,788,134 B1 * 7/2014 Litkouhi ............ B62D 15/0255
                                                         701/23
9,672,734 B1 * 6/2017 Ratnasingam .......... H04L 67/12
(Continued)

FOREIGN PATENT DOCUMENTS

DE   102015212950       11/2016
KR   1020100064179       6/2010
(Continued)

OTHER PUBLICATIONS

European Patent Office Application Serial No. 18151986.9, Search Report dated Sep. 3, 2018, 8 pages.
(Continued)

*Primary Examiner* — Faris S Almatrahi
*Assistant Examiner* — David A Testardi
(74) *Attorney, Agent, or Firm* — Lee Hong Degerman Kang & Waimey

(57) ABSTRACT

Disclosed is a driving assistance apparatus for a vehicle, including: a communication apparatus configured to perform V2X communication with an external device outside of the vehicle; and a processor which is configured to: acquire information about a set path for the vehicle; receive V2V data from one or more other vehicles through the communication apparatus; based on the information about the set path and the one or more V2V data, select, from among the one or more V2V data, data of interest which is V2V data transmitted by a vehicle of interest which is a other vehicle located on the set path; and set a recommended path for the vehicle based on the data of interest.

16 Claims, 25 Drawing Sheets

(51) Int. Cl.
*B60W 30/10* (2006.01)
*B60W 30/18* (2012.01)
*G08G 1/16* (2006.01)
*B60W 30/095* (2012.01)
*B60W 10/04* (2006.01)
*B60W 10/18* (2012.01)
*B60W 10/20* (2006.01)
*B60W 50/04* (2006.01)
*B60W 50/08* (2020.01)
*B60W 40/08* (2012.01)
*B60W 40/06* (2012.01)
*B60W 50/14* (2020.01)

(52) U.S. Cl.
CPC .... *B60W 30/165* (2013.01); *B60W 30/18163* (2013.01); *G08G 1/09675* (2013.01); *G08G 1/096783* (2013.01); *G08G 1/166* (2013.01); *B60W 10/04* (2013.01); *B60W 10/18* (2013.01); *B60W 10/20* (2013.01); *B60W 40/06* (2013.01); *B60W 40/08* (2013.01); *B60W 50/08* (2013.01); *B60W 2050/046* (2013.01); *B60W 2050/146* (2013.01); *B60W 2420/52* (2013.01); *B60W 2420/62* (2013.01); *B60W 2556/65* (2020.02); *G08G 1/164* (2013.01); *G08G 1/165* (2013.01)

(58) Field of Classification Search
CPC ....... G08G 1/163; G08G 1/167; H04W 4/023; H04W 4/46; B60W 30/095; B60W 2550/408; G05D 1/0088; G01C 21/3658
See application file for complete search history.

(56) References Cited

U.S. PATENT DOCUMENTS

| | | | | |
|---|---|---|---|---|
| 10,185,327 B1* | 1/2019 | Konrardy | | B60R 25/252 |
| 10,495,480 B1* | 12/2019 | Sivaraman | | B60W 50/0097 |
| 2007/0109146 A1* | 5/2007 | Tengler | | G08G 1/161 |
| | | | | 340/902 |
| 2010/0164789 A1* | 7/2010 | Basnayake | | G01S 5/0072 |
| | | | | 342/357.23 |
| 2010/0198513 A1* | 8/2010 | Zeng | | G08G 1/163 |
| | | | | 701/300 |
| 2011/0109475 A1* | 5/2011 | Basnayake | | G08G 1/096716 |
| | | | | 340/902 |
| 2012/0059574 A1* | 3/2012 | Hada | | G08G 1/096741 |
| | | | | 701/119 |
| 2012/0072104 A1* | 3/2012 | Sakai | | B60W 30/09 |
| | | | | 701/400 |
| 2012/0150437 A1* | 6/2012 | Zeng | | G01C 21/30 |
| | | | | 701/456 |
| 2013/0275033 A1* | 10/2013 | Bastiaensen | | G01C 21/26 |
| | | | | 701/119 |
| 2013/0278440 A1* | 10/2013 | Rubin | | G08G 9/02 |
| | | | | 340/903 |
| 2013/0289824 A1* | 10/2013 | Mudalige | | G08G 1/167 |
| | | | | 701/41 |
| 2014/0032100 A1* | 1/2014 | Park | | G01C 21/30 |
| | | | | 701/446 |
| 2015/0194055 A1* | 7/2015 | Maass | | G08G 1/0133 |
| | | | | 340/905 |
| 2016/0133128 A1* | 5/2016 | Koo | | G06K 9/00805 |
| | | | | 701/117 |
| 2016/0260328 A1* | 9/2016 | Mishra | | G05D 1/0088 |
| 2016/0321924 A1* | 11/2016 | Lewis | | B60W 50/0097 |
| 2017/0025017 A1* | 1/2017 | Thomas | | H04L 67/12 |
| 2017/0031361 A1* | 2/2017 | Olson | | G08G 1/166 |
| 2017/0083021 A1* | 3/2017 | Balaghiasefi | | G08G 1/166 |
| 2017/0313311 A1* | 11/2017 | Niino | | B60K 31/0008 |
| 2017/0336515 A1* | 11/2017 | Hosoya | | G01S 19/40 |
| 2018/0052005 A1* | 2/2018 | Schilling | | G08G 1/166 |
| 2018/0056998 A1* | 3/2018 | Benosman | | B60W 30/0956 |
| 2018/0251155 A1* | 9/2018 | Chan | | G08G 1/0125 |
| 2018/0259353 A1* | 9/2018 | Tsurumi | | G08G 1/09675 |
| 2018/0314247 A1* | 11/2018 | Sun | | B60W 30/00 |

FOREIGN PATENT DOCUMENTS

| | | |
|---|---|---|
| KR | 1020150108891 | 9/2015 |
| KR | 1020170082761 | 7/2017 |
| KR | 1020170088450 | 8/2017 |

OTHER PUBLICATIONS

Korean Intellectual Property Office Application No. 10-2017-0117384, Office Action dated Nov. 20, 2018, 10 pages.

* cited by examiner

DRIVING ASSISTANCE APPARATUS FOR VEHICLE AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2017-0117384, filed on Sep. 13, 2017, the contents of which are hereby incorporated by reference herein in their entirety.

BACKGROUND OF THE INVENTION

1. Field of the Invention

The present invention relates to a driving assistance apparatus for a vehicle, which sets a lane-level recommended path based on a road-level set path and data received from a other vehicle.

2. Description of the Related Art

A vehicle is an apparatus that moves in a direction desired by a user riding therein. A representative example of a vehicle may be an automobile.

Recently, vehicles have been equipped with various types of sensors and electronic devices for convenience of a user. In particular, Advance Driver Assistance Systems (ADASs) are being studied and researched briskly to help a user drive easily and conveniently. In addition, efforts have been being made to study and develop a driving system for a vehicle, which enables the vehicle to travel autonomously.

Vehicle-to-everything (V2X) communication technologies is performed by a vehicle to communicate with another device while on the move. While on the move, the vehicle receives various types of data from another vehicle, a mobile terminal possessed by a pedestrian, an infrastructure facility installed on the road, a server which provides traffic information, etc. The vehicle may determine a surrounding situation using the received data, and may autonomously travel without manipulation of a driver or perform a driver assistance function.

A driving assistance apparatus may determine a location of a vehicle based on GPS location information of the vehicle, and determine a location of a other vehicle based on GPS location information of the other vehicle.

Generally, GPS location information is given with road-level precision. Precision indicates a degree of how detailed a map is presented. For example, if location information of a vehicle is give with road-level precision, the driving assistance apparatus may determine, based on the location information, a road in which the vehicle is located. In this case, however, the driving assistance apparatus is not allowed to determine a lane in which the vehicle is located. On the other hand, if the location information of the vehicle is give with lane-level precision, the driving assistance apparatus may determine, based on the location information, even a lane in which the vehicle is located.

Accordingly, in the case of determining a location of a vehicle using GPS location information, the driving assistance apparatus is able to determine a road-level location of the vehicle, but unable to determine a lane-level location thereof.

In addition, a set path for a vehicle is generally given with road-level precision. Therefore, the driving assistance apparatus is able to display, on a map displayed on a navigation display, a road-level path required for the vehicle to travel, but unable to display a lane-level path therefor.

Recently, technologies for recommending a lane-level path using data transmitted by other vehicles travelling along a set path for a host vehicle have been being researched and developed.

SUMMARY OF THE INVENTION

The present invention has been made in view of the above problems, and it is one object of the present invention to provide a driving assistance apparatus for a vehicle, which determine an optimal lane-level path using data transmitted by other vehicles travelling along a set path for the vehicle.

It is another object of the present invention to provide a driver assistance apparatus for a vehicle, which determines a lane-level location of the vehicle or a other vehicle based on GPS location information and surrounding image information.

Objects of the present invention should not be limited to the aforementioned objects and other unmentioned objects will be clearly understood by those skilled in the art from the following description.

In accordance with an embodiment of the present invention, the above and other objects can be accomplished by the provision of a driving assistance apparatus for a vehicle, including: a communication apparatus configured to perform V2X communication with an external device outside of the vehicle; and a processor which is configured to: acquire information about a set path for the vehicle; receive V2V data from one or more other vehicles through the communication apparatus; based on the information about the set path and the one or more V2V data, select, from among the one or more V2V data, data of interest which is V2V data transmitted by a vehicle of interest which is a other vehicle located on the set path; and set a recommended path for the vehicle based on the data of interest.

The details of other embodiments are included in the following description and the accompanying drawings.

The embodiments of the present invention have one or more effects as follows.

First, it is possible to determine a more accurate location of a vehicle or a other vehicle, compared to when determining the location of the vehicle using general GPS location information.

Second, it is possible to reduce communication load, by using only data transmitted by a other vehicle located on a set path for a vehicle.

Third, as a recommended path indicating a lane which a vehicle needs to travel is set, it is possible to provide a user with a path more detailed than an existing set path which indicates a road which the vehicle needs to travel, thereby improving a driver's convenience.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
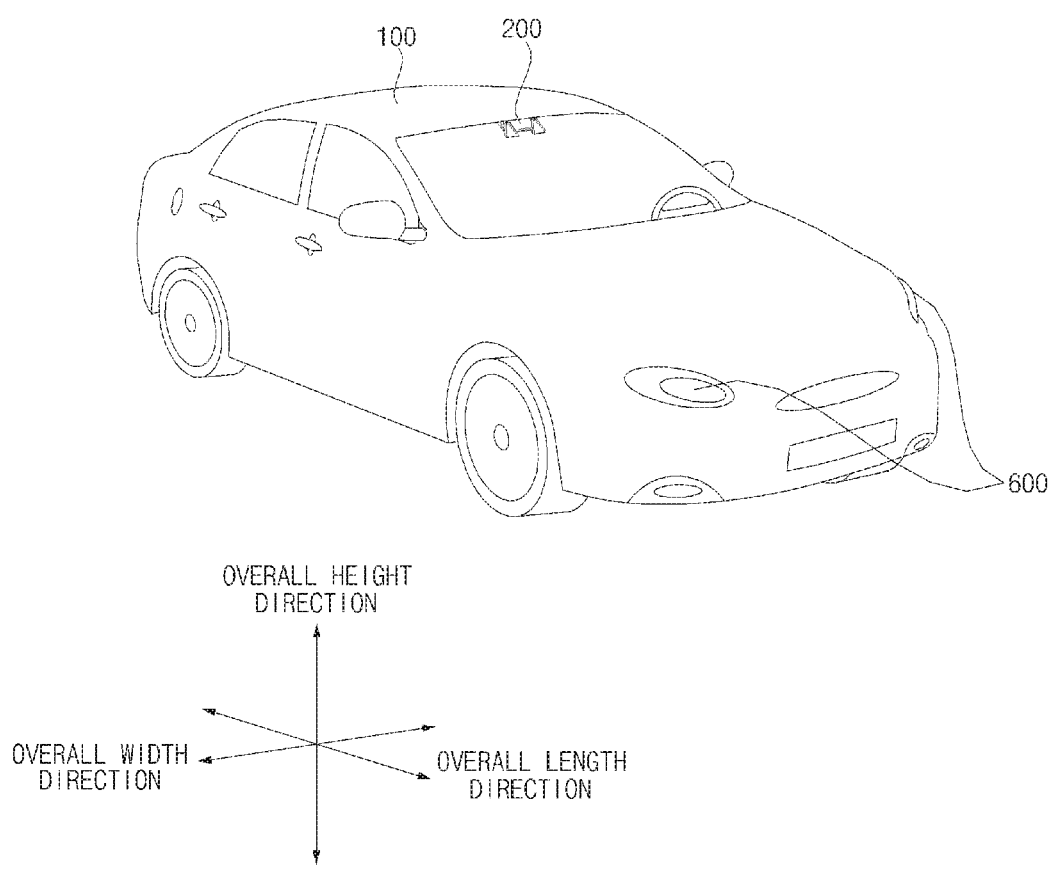
FIG. 1 is a view illustrating the external appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIGS. 1 to 7 are diagrams for explanation of a vehicle according to the present invention. Hereinafter, the vehicle according to the present invention will be described with reference to FIGS. 1 to 7.

FIG. 1 is a view of the external appearance of a vehicle according to an embodiment of the present invention.

Figure 2A:
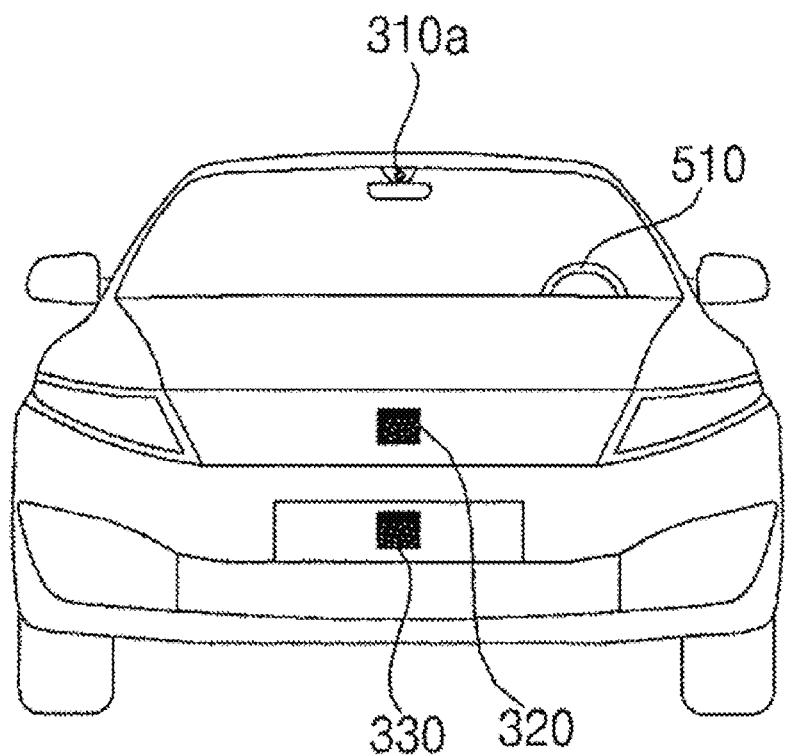
FIGS. 2A, 2B, 2C are views respectively illustrating front, top, and rear exteriors of a vehicle according to an embodiment of the present invention.
Figure 2B:
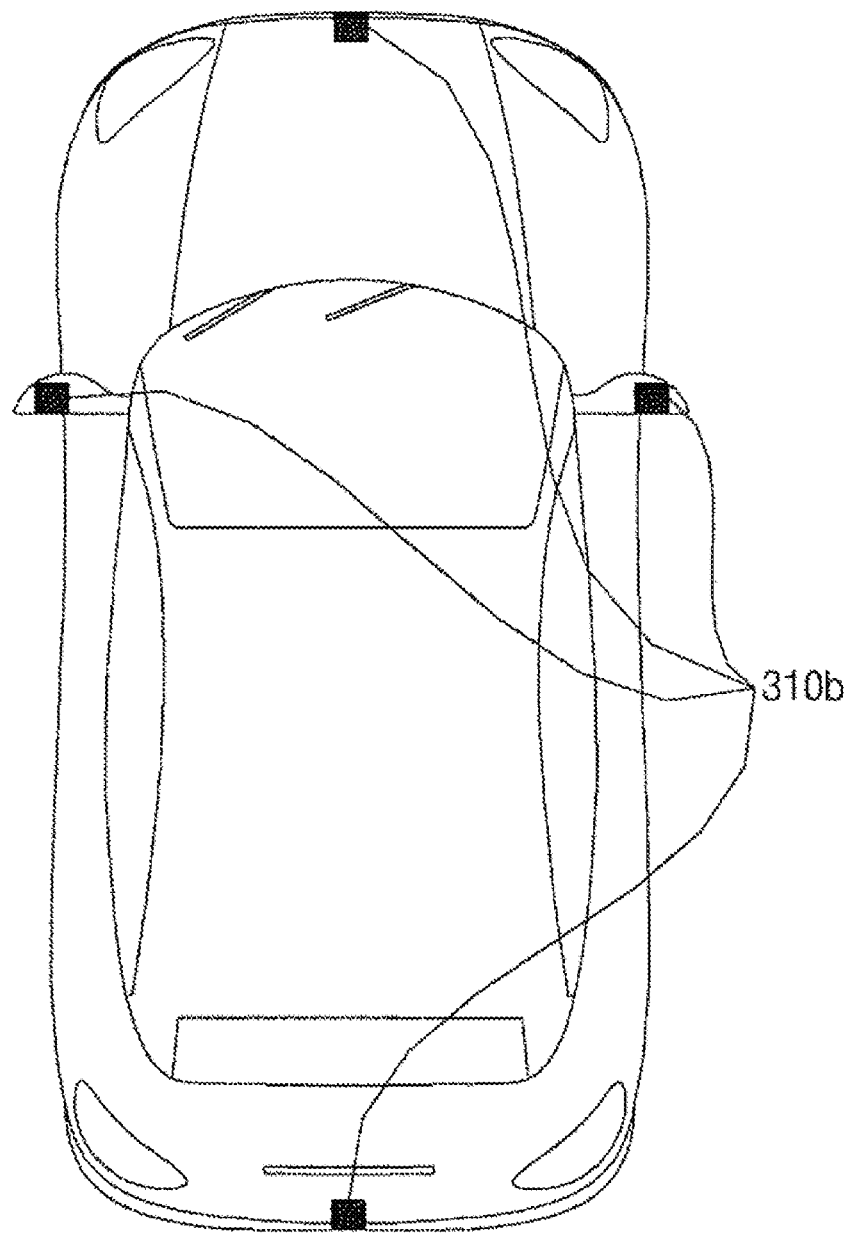
Figure 2C:
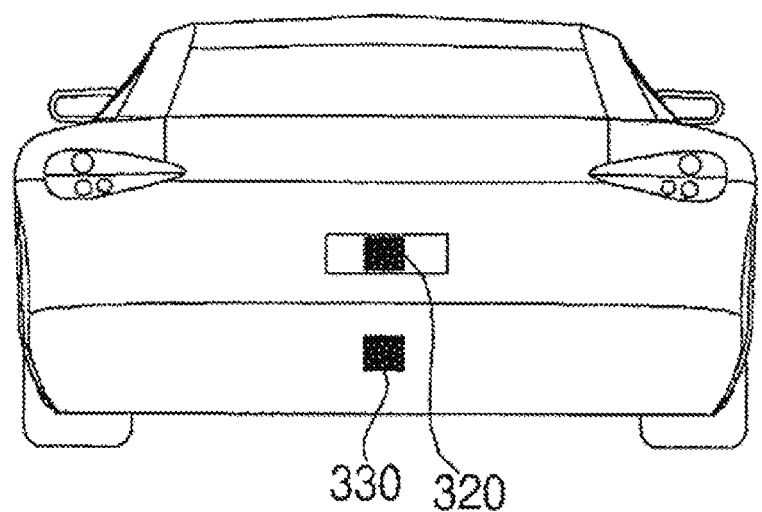

FIGS. 2A, 2B, 2C are different angled views of a vehicle according to an embodiment of the present invention.

Figure 3:
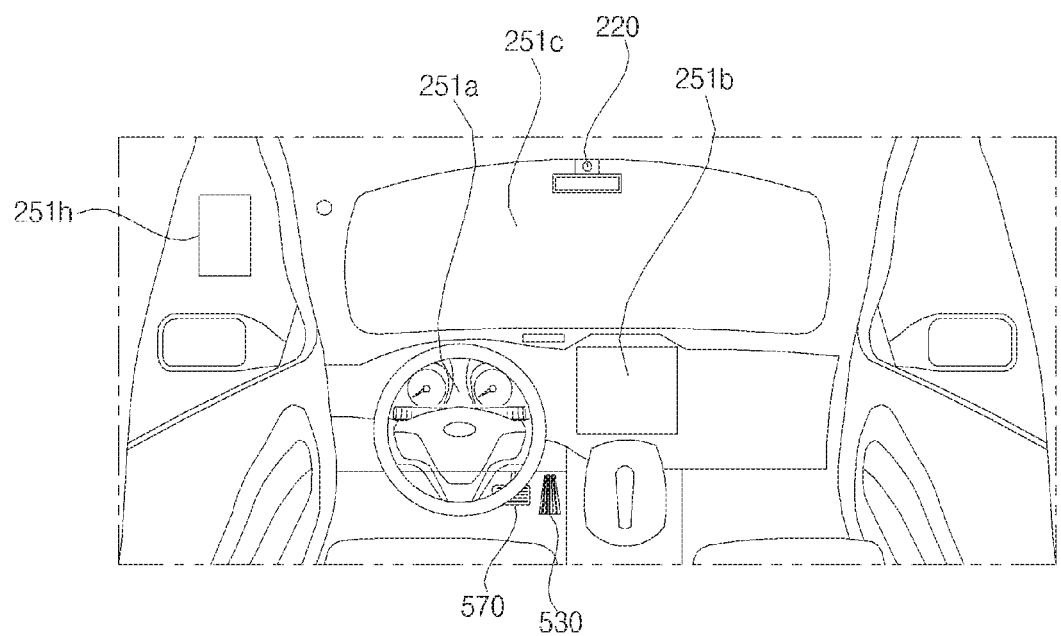
FIGS. 3 and 4 are views illustrating the interior configuration of a vehicle according to an embodiment of the present invention.
Figure 4:
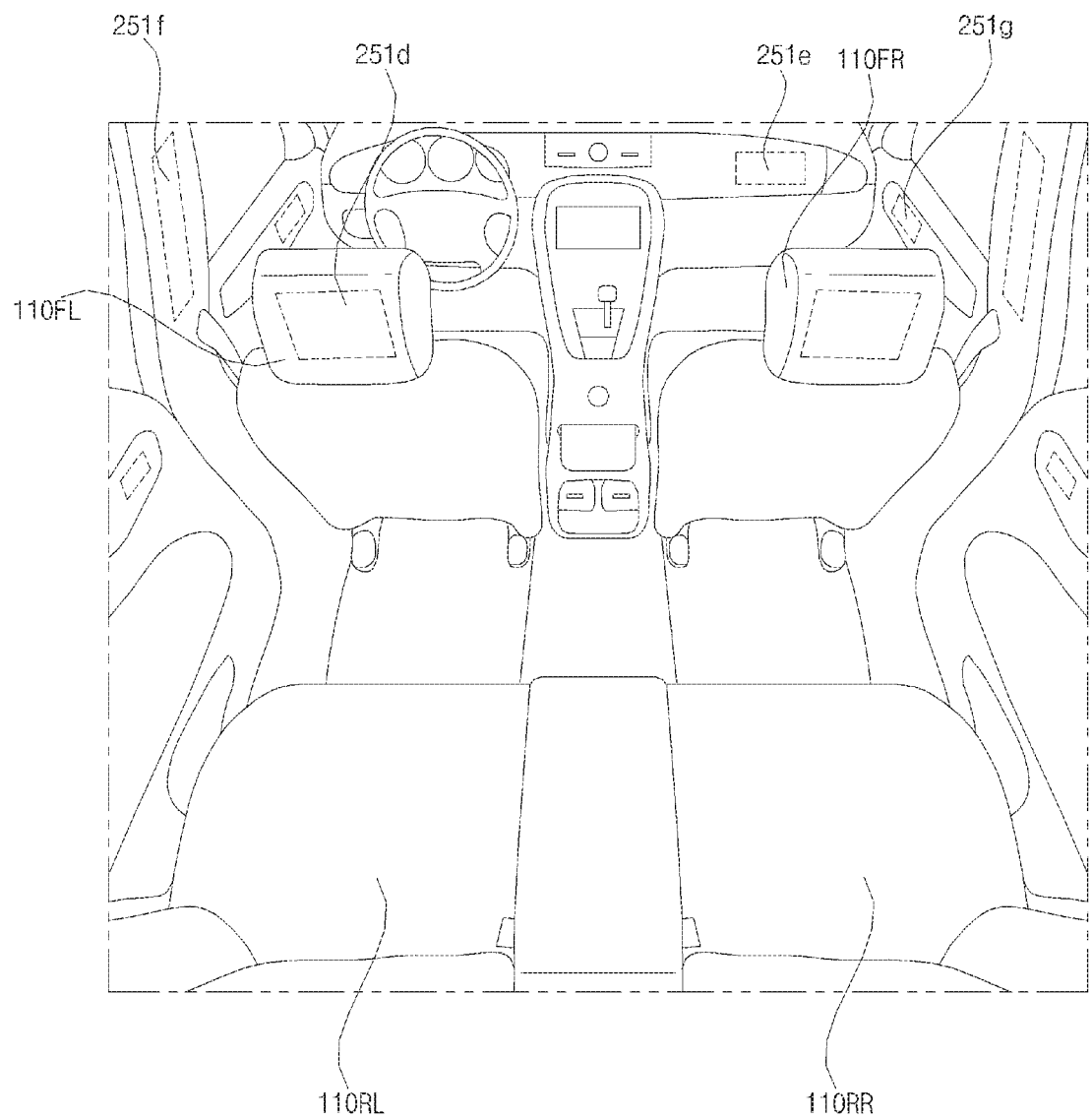

FIGS. 3 and 4 are views of the internal configuration of a vehicle according to an embodiment of the present invention.

Figure 5:
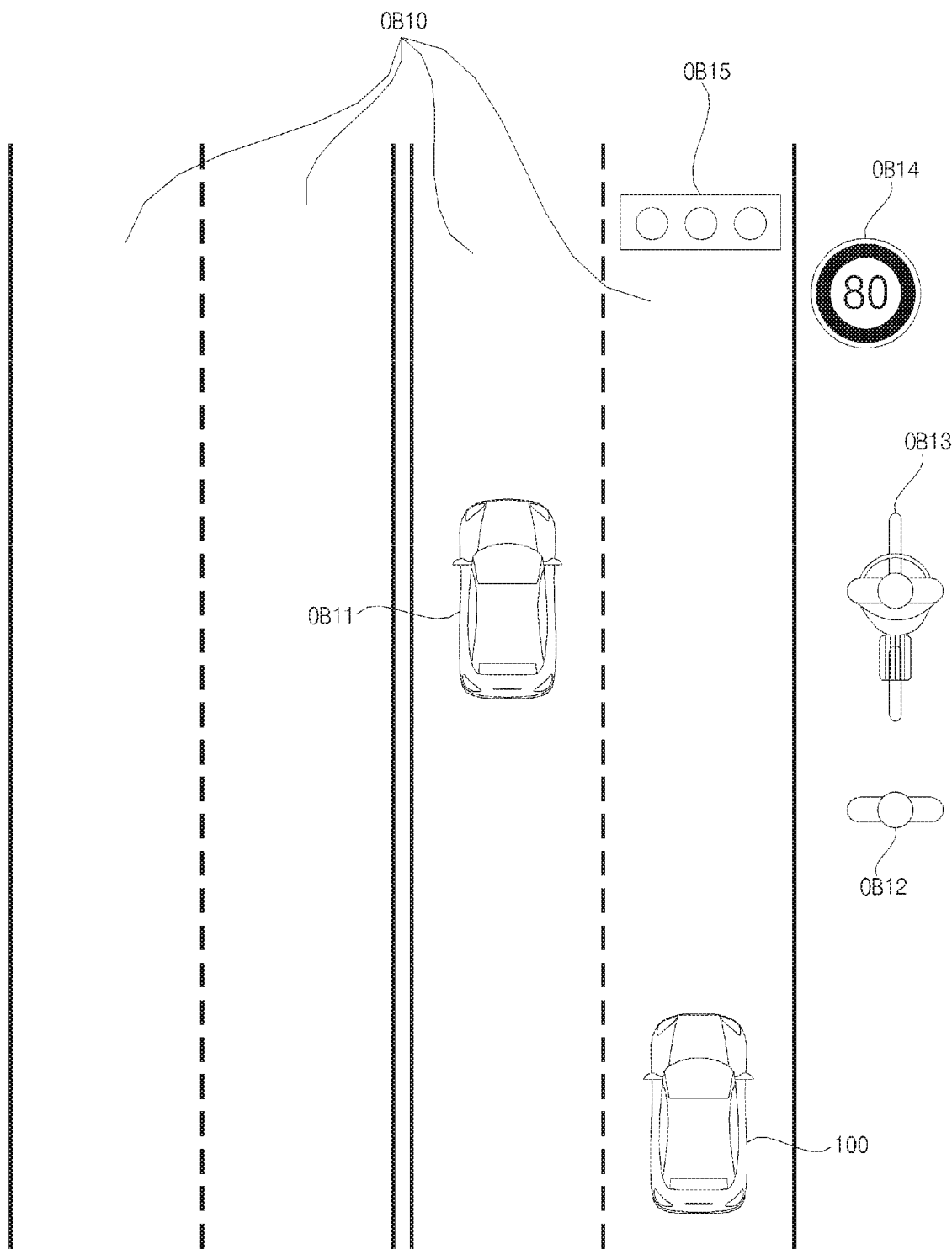
FIGS. 5 and 6 are views for explanation of objects according to an embodiment of the present invention.
Figure 6:
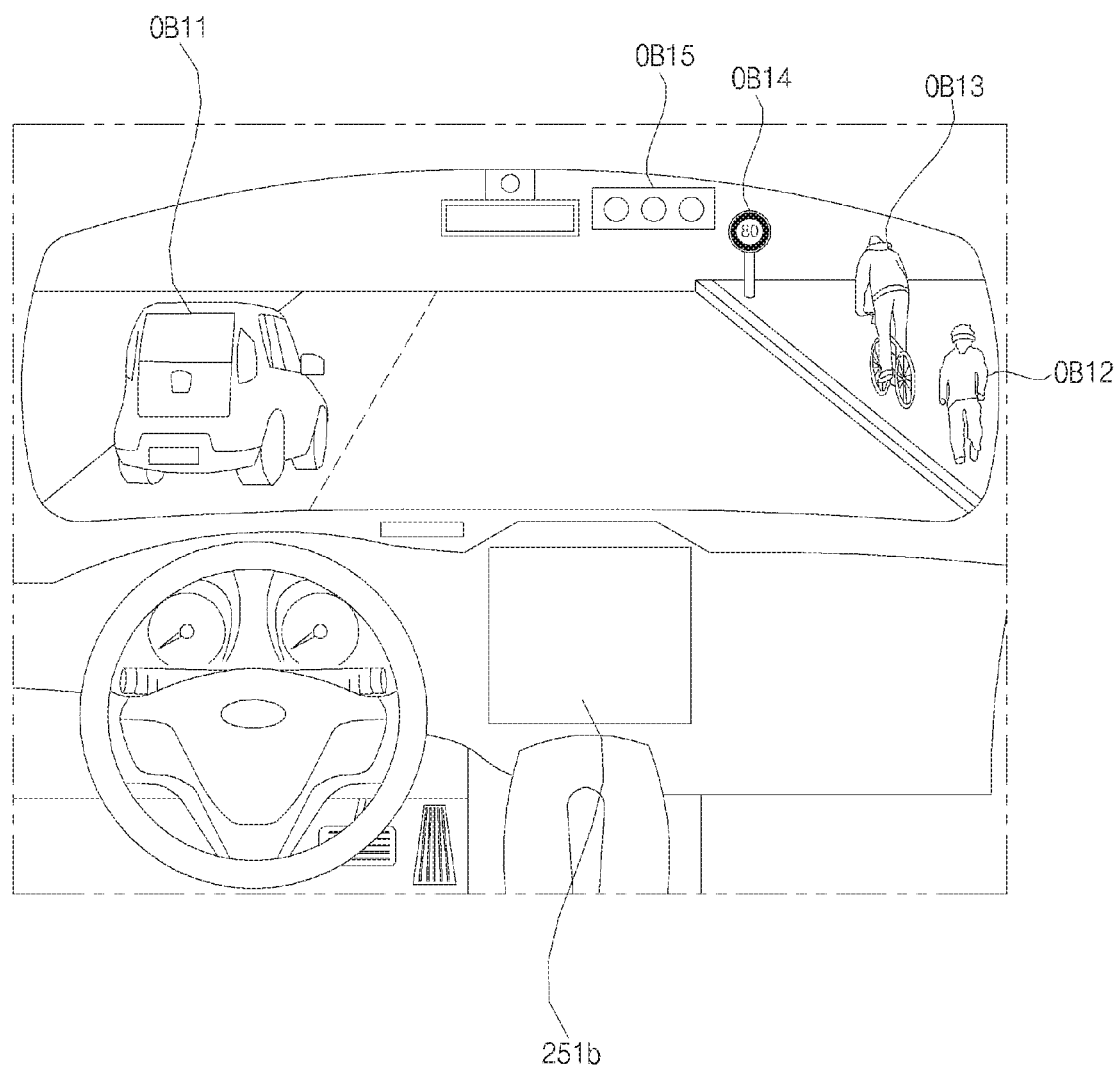

FIGS. 5 and 6 are views for explanation of objects according to an embodiment of the present invention.

Figure 7:
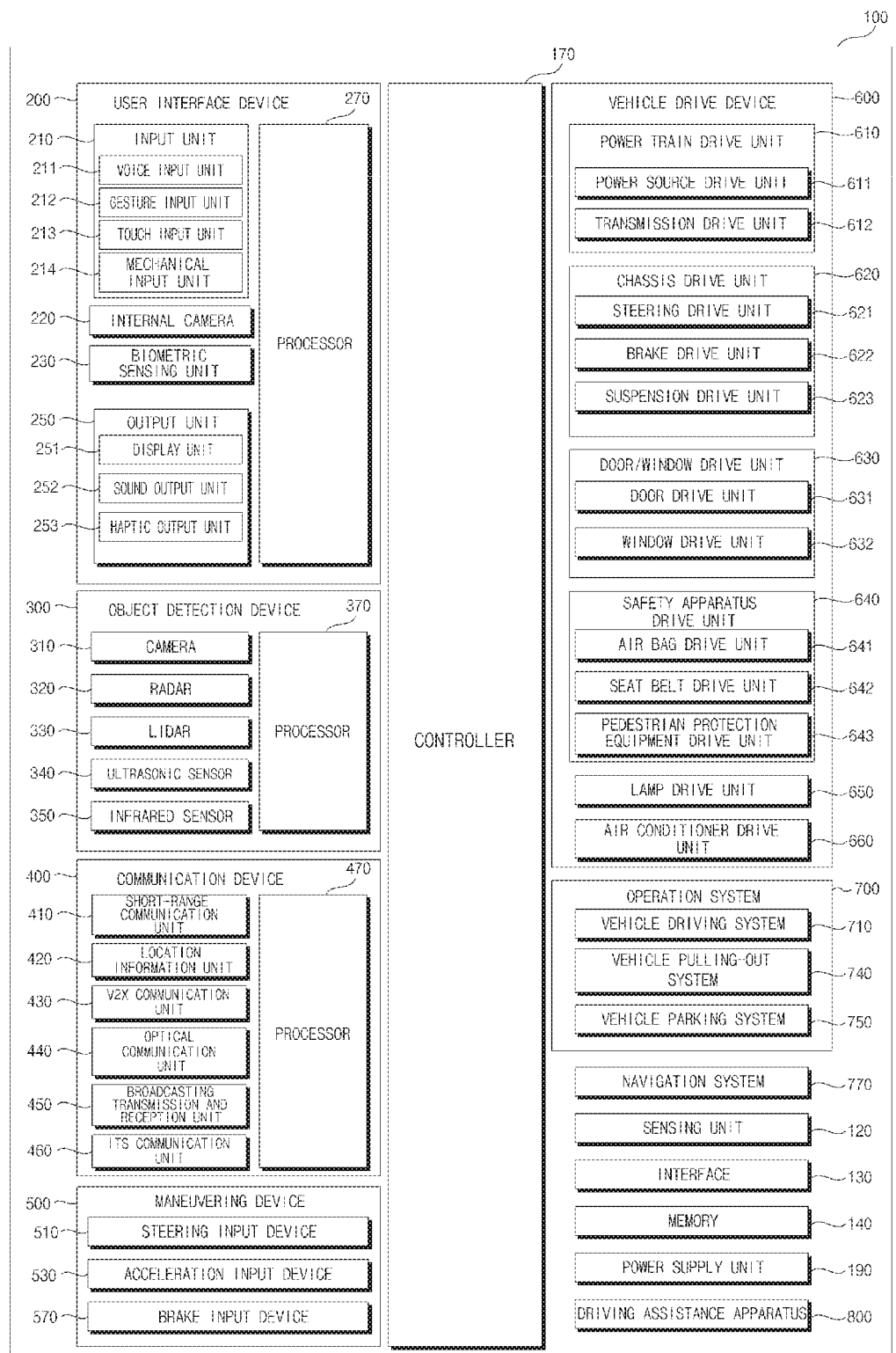
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle may include various driving assistance apparatuses. A driving assistance apparatus is an apparatus which assists a driver based on information acquired by various sensors. The driving assistance apparatus may be referred to as an Advanced Driver Assistance System (ADAS).

The vehicle 100 may include various lighting devices for vehicle. A lighting device for vehicle may include a head lamp, a brake lamp, a tail lamp, a turn signal lamp, a room lamp, etc. The rear combination lamp includes a brake lamp and a trail lamp.

The vehicle 100 may include a sensing device inside the vehicle 100, and a sensing device outside the vehicle 100.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

The vehicle 100 may be an autonomous vehicle. The vehicle 100 may travel autonomously under the control of a controller 170. The vehicle 100 may travel autonomously based on vehicle driving information.

The vehicle driving information may be information that is acquired by various units provided in the vehicle 100 during travelling of the vehicle 100. The vehicle driving information may be information which is used to control the vehicle 100 by the controller 170 or a vehicle travel system 700.

Depending on a type of relevant content, the vehicle driving information may be classified as surrounding situation information related to the surroundings of the vehicle 100, vehicle state information related to a state of any of various devices included in the vehicle, or occupant information related to an occupant in the vehicle 100. Accordingly, the vehicle driving information may include at least one of the surrounding situation information, the vehicle state information, and the occupant information.

Depending on a type of a providing device, the vehicle driving information may be classified as object information acquired by an object detection apparatus 300, information received from a communication apparatus 400, a user input received by a user interface apparatus 200 or a driving manipulation apparatus 500, navigation information provided by a navigation system 770, various kinds of sensing information provided by a sensing unit 120, and information stored in a memory. Accordingly, the vehicle driving information may include at least one of the object information, the communication information, the user input, the navigation information, the sensing information, information acquired and provided by an interface unit 130, and storage information.

The vehicle driving information may be acquired by at least one of the user interface apparatus 200, the object detection apparatus 300, the communication apparatus 400, the driving manipulation apparatus 500, the navigation system 770, the sensing unit 120, the interface unit 130, and the memory 140, and then may be provided to the controller 170 or the vehicle travel system 700. The controller 170 or the vehicle travel system 700 may control the vehicle 100 based on the vehicle driving information so as to enable the vehicle 100 to travel autonomously.

The object information may be information about an object detected by the object detection apparatus 300. For example, the object information may be information about a type, a location, a size, and a color of the object. For example, the object information may be information about a line, an image painted on a road surface, an obstacle, a other vehicle, a pedestrian, a traffic light, various structures, and a traffic sign.

The communication information may be information transmitted by an external device which is able to perform communication. For example, the communication information may include at least one of the following: information transmitted by a other vehicle; information transmitted by a mobile terminal; information transmitted by a traffic infrastructure, and information existing in a specific network. The traffic infrastructure may include a traffic light, and the traffic light may transmit information about a traffic signal.

In addition, the vehicle driving information may include at least one of the following: information about a state of any of various devices included in the vehicle 100; and information about a location of the vehicle 100. For example, the vehicle driving information may include information about an error of any of various devices included in the vehicle 100, information about an operational state of any of various devices included in the vehicle 100, information about a lane in which the vehicle 100 is now travelling, and map information.

For example, based on the vehicle driving information, the controller 170 or the vehicle travel system 700 may determine a type, a location, and movement of an object located in the vicinity of the vehicle 100. Based on the vehicle driving information, the controller 170 or the vehicle travel system 700 may determine: a probability of collision between the vehicle 100 and an object; a type of a road in which the vehicle 100 is travelling; a state of a traffic light in the vicinity of the vehicle 100; and movement of the vehicle 100.

Out of the vehicle driving information, information about an environment or situation in the surroundings of the vehicle 100 may be referred to as surrounding environment information or surrounding situation information. For example, the object information acquired by the object detection apparatus 300 is information corresponding to the surrounding situation information. For example, out of the communication information received by the communication apparatus 400 from an external communication device, information about an area in which the vehicle 100 is travelling, traffic condition information, and information about a other vehicle are information corresponding to the surrounding situation information. For example, out of the navigation information provided by the navigation system 770, map information or location information of the vehicle 100 is information corresponding to the surrounding situation information.

Occupant information is information about an occupant in the vehicle 100. Out of the vehicle driving information, the information about an occupant in the vehicle 100 may be referred to as occupant information.

The occupant information may be acquired by an internal camera 220 or a biometric sensing unit 230. In this case, the occupant information may include at least one of an image of the occupant in the vehicle 100 and biometric information of the occupant.

For example, the occupant information may be an image of the occupant acquired by the internal camera 220. For example, the biometric information may be body temperature information, heart rate information, and brainwaves information of the occupant acquired by the biometric sensing unit 230.

For example, based on the occupant information, the controller 170 may determine a location, a shape, a gaze, a face, a behavior, a facial expression, drowsiness, a health condition, and an emotional state of an occupant.

In addition, the occupant information may be information transmitted by a mobile terminal of an occupant and received by the communication apparatus 400. For example, the occupant information may be authentication information used to authenticate an occupant.

The occupant information may be acquired by an occupant detection unit 240 or the communication apparatus 400 and may be provided to the controller 170. The occupant information may be a concept included in the vehicle driving information.

Vehicle state information is information about a state of any of various units included in the vehicle 100. Out of the vehicle driving information, the information about a state of any of the units included in the vehicle 100 may be referred to as vehicle state information.

For example, the vehicle state information may include information about an operational state and an error of any one of the following: the user interface apparatus 200, the object detection apparatus 300, the communication apparatus 400, the driving manipulation apparatus 500, the vehicle drive apparatus 600, the vehicle travel system 700, the navigation system 770, the sensing unit 120, the interface unit 130, and the memory 140.

Based on the vehicle state information, the controller 170 may determine an operation or an error of any of various units included in the vehicle 100. For example, based on the vehicle state information, the controller 170 may determine whether a GPS signal is properly received from the vehicle 100, whether an error has occurred in at least one sensor included in the vehicle 100, or whether each device included in the vehicle 100 operates properly.

The vehicle state information may be a concept included in the vehicle driving information.

A control mode of the vehicle 100 may be a mode indicating a subject which controls the vehicle 100.

For example, the control mode of the vehicle 100 may include: an autonomous mode in which the controller 170 or the vehicle travel system 700 included in the vehicle 100 controls the vehicle 100; a manual mode in which a driver of the vehicle 100 controls the vehicle 100; and a remote control mode in which a device other than the vehicle 100 controls the vehicle 100.

When the vehicle 100 is in the autonomous mode, the controller 170 or the vehicle travel system 700 may control the vehicle 100 based on the vehicle driving information. Accordingly, the vehicle 100 may travel without a user's command received through the driving manipulation apparatus 500. For example, when the vehicle is in the autonomous mode, the vehicle 100 may travel based on information, data, or a signal generated by a driving system 710, a parking-out system 740, and a parking system 750.

When the vehicle 100 is in the manual mode, the vehicle 100 may be controlled in accordance with a user's command relating to at least one of steering, acceleration, and deceleration of the vehicle 100 received through the driving manipulation apparatus 500. In this case, the driving manipulation apparatus 500 may generate an input signal corresponding to the user's command and provide the input signal to the controller 170. The controller 170 may control the vehicle 100 based on the input signal provided by the driving manipulation apparatus 500.

When the vehicle 100 is in the remote control mode, a device other than the vehicle 100 may control the vehicle 100. When travelling in the remote control mode, the vehicle 100 may receive a remote control signal from a different device through the communication apparatus 400. The vehicle 100 may be controlled based on the remote control signal.

The vehicle 100 may enter one of the autonomous mode, the manual mode, and the remote control mode based on a user input received through the user interface apparatus 200.

The control mode of the vehicle 100 may switch to one of the autonomous mode, the manual mode, and the remote control mode based on the vehicle driving information. For example, the control mode of the vehicle 100 may switch from the manual mode to the autonomous mode or from the autonomous mode to the manual mode based on object information generated by the object detection apparatus 300. The control mode of the vehicle 100 may switch from the manual mode to the autonomous mode or from the autonomous mode to the manual mode based on information received through the communication apparatus 400.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190. In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and an interface processor 270.

In some embodiments, the user interface apparatus 200 may further include other components in addition to the aforementioned components, or may not include some of the aforementioned components.

The input unit 210 is configured to receive a user input from a user, and data collected in the input unit 210 may be analyzed by the interface processor 270 and considered as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert a gesture input of a user into an electrical signal. The converted electrical signal may be provided to the interface processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the interface processor 270 or the controller 170.

The touch input unit 213 may include a touch sensor for sensing a touch input of a user.

In some embodiments, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the interface processor 270 or the controller 170.

The mechanical input unit 214 may be located on a steering wheel, a center fascia, a center console, a cockpit module, a door, etc.

An occupant detection unit 240 may detect an occupant inside the vehicle 100. The occupant detection unit 240 may include an internal camera 220 and a biometric sensing unit 230.

The internal camera 220 may acquire images of the inside of the vehicle 100. The interface processor 270 may sense a user state based on the images of the inside of the vehicle 100. For example, the detected user state may be a gaze, a face, a behavior, a facial expression, and a location of a user.

The interface processor 270 may determine a gaze, a face, a behavior, a facial expression, and a location of a user based on images of inside of the vehicle 100 acquired by the internal camera 220. The interface processor 270 may determine a user's gesture based on the images of the inside of the vehicle 100. A determination made by the interface processor 270 based on the images of the inside of the vehicle may be referred to as occupant information. In this case, the occupant information may be information indicating a gaze direction, a behavior, a facial expression, and a gesture of the user. The interface processor 270 may provide the occupant information to the controller 170.

The biometric sensing unit 230 may acquire biometric information of the user. The biometric sensing unit 230 may include a sensor for acquire biometric information of the user, and may utilize the sensor to acquire finger print information, heart rate information, and brainwave information of a user. The biometric information may be used to authenticate a user or determine a state of the user.

The interface processor 270 may determine a user's state based on the user's biometric information acquired by the biometric sensing unit 230. The user's state determined by the interface processor 270 may be referred to as occupant information. In this case, the occupant information may be information indicating whether the user loses consciousness, is drowsy, is excited, or is in an emergency situation. The interface processor 270 may provide the occupant information to the controller 170.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the interface processor 270 or the controller 170 into an audio signal, and outputs the audio signal. To this end, the sound output unit 252 may include one or more speakers.

The haptic output unit 253 generates a tactile output. For example, the tactile output is vibration. The haptic output unit 253 may operate to vibrate a steering wheel, a safety belt, and seats 110FL, 110FR, 110RL, and 110RR so as to allow a user to recognize the output.

The interface processor 270 may control the overall operation of each unit of the user interface apparatus 200.

In some embodiments, the user interface apparatus 200 may include a plurality of interface processors 270 or may not include any interface processor 270.

In the case where the user interface apparatus 200 does not include any interface processor 270, the user interface apparatus 200 may operate under control of the controller 170 or a processor of a different device inside the vehicle 100.

Meanwhile, the user interface apparatus 200 may be referred to as a multimedia device for vehicle.

The user interface apparatus 200 may operate under the control of the controller 170.

The object detection apparatus 300 is configured to detect an object outside the vehicle 100.

The object may include various objects related to travelling of the vehicle 100.

Referring to FIGS. 5 and 6, an object o may include a lane OB10, a line for distinguishing the lane OB10, a other vehicle OB11, a pedestrian OB12, a two-wheeled vehicle OB13, a traffic signal OB14 and OB15, a curb for distinguishing a sidewalk, a light, a road, a structure, a bump, a geographical feature, an animal, etc.

The lane OB10 may be a lane in which the vehicle 100 is traveling, a lane next to the lane in which the vehicle 100 is travelling, or a lane in which a other vehicle is travelling in the opposite direction. The lane OB10 may include left and right lines that define the lane.

The other vehicle OB11 may be a vehicle travelling in the vicinity of the vehicle 100. The other vehicle OB11 may be a vehicle existing within a predetermined distance from the vehicle 100. For example, the other vehicle OB11 may be a vehicle that is preceding or following the vehicle 100. For example, the other vehicle OB11 may be a vehicle travelling on the side of the vehicle 100.

The pedestrian OB12 may be a person located in the vicinity of the vehicle 100. The pedestrian OB12 may be a person existing within a predetermined distance from the vehicle 100. For example, the pedestrian OB12 may be a person existing on a sidewalk or on the roadway.

The two-wheeled vehicle OB13 is a vehicle located in the vicinity of the vehicle 100 and moves with two wheels. The two-wheeled vehicle OB13 may be a vehicle that has two wheels existing within a predetermined distance from the vehicle 100. For example, the two-wheeled vehicle OB13 may be a motorcycle or a bike existing on a sidewalk or the roadway.

The traffic signal OB14 and OB15 may include a traffic light OB15, a traffic sign OB14, and a pattern or text painted on a road surface.

The light may be light generated by a lamp provided in the other vehicle OB11. The light may be light generated by a street light. The light may be solar light.

The road may include a road surface, a curve, and slopes, such as an upward slope and a downward slope. The geographical feature may include a mountain and a hill.

The structure may be a body located around the road in the state of being fixed onto the ground. For example, the structure may include a streetlight, a roadside tree, a building, a traffic light, a bridge, a curb, and a guardrail.

The object may be classified as a movable object or a stationary object. For example, the movable object is an object that can move. For example, the movable object may be a concept including a other vehicle and a pedestrian. The stationary object is an object that cannot move. For example, the stationary object may be a concept including a traffic light, a road, a structure, and a line.

The object detection apparatus 300 may detect an obstacle located outside the vehicle 100. The obstacle may be one of an object, a puddle on the road, an uphill start point, a downhill start point, an inspection pit, a bump, and a curb. The object may be an object having volume and mass.

The object detection apparatus 300 may include a camera 310, a radar 320, a lidar 330, an ultrasonic sensor 340, an infrared sensor 350, and a detection processor 370.

In some embodiments, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide the acquired image to the detection processor 370. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object existing within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object existing in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object existing in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object existing in front of the vehicle 100, an object located to the rear of the vehicle 100, or an object located to the side of the vehicle 100.

The detection processor 370 may control the overall operation of each unit of the object detection apparatus 300.

The detection processor 370 may detect and track an object based on acquired images. For example, using an image processing algorithm, the detection processor 370 may calculate the distance to the object and the speed relative to the object, determine a type, a location, a size, a shape, and a path of travel of the object, and determine content of a detected text.

The detection processor 370 may detect and track an object based on a reflection electromagnetic wave which is formed as a result of reflection a transmission electromagnetic wave by the object. Based on the electromagnetic wave, the detection processor 370 may, for example, calculate the distance to the object and the speed relative to the object.

The detection processor 370 may detect and track an object based on a reflection laser light which is formed as a result of reflection of transmission laser by the object. Based on the laser light, the detection processor 370 may, for example, calculate the distance to the object and the speed relative to the object.

The detection processor 370 may detect and track an object based on a reflection ultrasonic wave which is formed as a result of reflection of a transmission ultrasonic wave by the object. Based on the ultrasonic wave, the detection processor 370 may, for example, calculate the distance to the object and the speed relative to the object.

The detection processor 370 may detect and track an object based on reflection infrared light which is formed as a result of reflection of transmission infrared light by the object. Based on the infrared light, the detection processor 370 may, for example, calculate the distance to the object and the speed relative to the object.

The detection processor 370 may generate object information based on at least one of the following: an image acquired using the camera 310, a reflected electromagnetic wave received using the RADAR 320, a reflected laser beam received using the LIDAR 330, a reflected ultrasonic wave received using the ultrasonic sensor 340, and a reflected infrared light received using the infrared sensor 350.

Object information may be information on a type, a location, a size, a shape, a color, a path of travel, and a speed of an object in the vicinity of the vehicle 100, and content of a detected text.

For example, the object information may indicate the following: whether there is a lane in the vicinity of the vehicle 100; whether other vehicles are travelling in the vicinity of the vehicle 100 while the vehicle 100 is stopped; whether there is a parking available space in the vicinity of the vehicle 100; a probability for the vehicle 100 to collide with an object; a location of any pedestrian or bicycle in the vicinity of the vehicle 100; a type of the road on which the vehicle 100 is travelling; the current traffic signal indicated by a traffic light in the vicinity of the vehicle 100; and movement of the vehicle. The object information may be included in the vehicle driving information.

The detection processor 370 may provide generated object information to the controller 170.

In some embodiments, the object detection apparatus 300 may include a plurality of processors 370 or may not include the detection processor 370. For example, each of the camera 310, the radar 320, the lidar 330, the ultrasonic sensor 340, and the infrared sensor 350 may include its own processor.

The object detection apparatus 300 may operate under the control of the controller 170 or a processor inside the vehicle 100.

The communication apparatus 400 is configured to perform communication with an external device. The external device may be a other vehicle, a mobile terminal, a wearable device, or a server.

To perform communication, the communication apparatus 400 may include at least one selected from a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a communication processor 470.

In some embodiments, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS) module.

The location information unit 420 may acquire GPS information using the GPS module. The location information unit 420 may transmit the acquired GPS information to the controller 170 or the communication processor 470. The GPS information acquired by the location information unit 420 may used for autonomous travelling of the vehicle 100. For example, the controller 170 may control the vehicle 100 based on GPS information and navigation information acquired by the navigation system 770, so that the vehicle 100 travels autonomously.

The V2X communication unit 430 is configured to perform wireless communication between a vehicle and a server (that is, vehicle to infra (V2I) communication), wireless communication between a vehicle and a other vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 performs communication with a server that provides an intelligent traffic system. The ITS communication unit 460 may receive information on various traffic conditions from the server of the intelligence traffic system. Information on a traffic condition may include a degree of traffic congestion, a traffic condition on each road, and an amount of traffics in each area.

The communication processor 470 may control the overall operation of each unit of the communication apparatus 400.

The vehicle driving information may include information received using at least one of the short-range communication unit 410, the location information unit 420, the V2X communication unit 430, the optical communication unit 440, and the broadcast transmission and reception unit 450.

For example, the vehicle driving information may include information received from a other vehicle, the information which is about a location, a model, a driving lane, a speed, and various sensed values of the other vehicle. When information on various sensed values of the other vehicle is received, the controller 170 may acquire information on various objects in the vicinity of the vehicle 100, even through the vehicle 100 does not include an additional sensor.

For example, the vehicle driving information may indicate the following: a type, location, and movement of an object in the vicinity of the vehicle 100; whether other vehicles are travelling in the vicinity of the vehicle 100 when the vehicle 100 is stopped; whether there is a parking available space in the vicinity of the vehicle 100; a probability for the vehicle 100 to collide with an object; a location of any pedestrian or bicycle in the vicinity of the vehicle 100; a type of the road on which the vehicle 100 is travelling; the current traffic signal indicated by a traffic light in the vicinity of the vehicle 100; and movement of the vehicle.

In some embodiments, the communication apparatus 400 may include a plurality of communication processors 470, or may not include any communication processor 470.

In the case where the communication apparatus 400 does not include the communication processor 470, the communication apparatus 400 may operate under control of the controller 170 or a processor of a device inside of the vehicle 100.

Meanwhile, the communication apparatus 400 may implement a vehicle multimedia device, together with the user interface apparatus 200. In this case, the vehicle multimedia device may be referred to as a telematics device or an Audio Video Navigation (AVN) device.

The communication apparatus 400 may operate under the control of the controller 170.

The driving manipulation apparatus 500 is configured to receive a user command for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user command for steering of the vehicle 100 from a user. The user command for steering may be a command corresponding to a specific steering angle. For example, the user command for steering may correspond to a right 45 degrees.

The steering input device 510 may be in the form of a wheel so as to receive a steering input which is made by rotation of the wheel. In this case, the steering input device 510 may be referred to as a steering wheel or a handle.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user command for acceleration of the vehicle from a user.

The brake input device 570 may receive a user input for deceleration of the vehicle 100 from a user. The acceleration input device 530 and the brake input device 570 may be in the form of a pedal.

In some embodiments, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive apparatus 600 may further include other components in addition to the aforementioned components, or may not include some of the aforementioned components.

Meanwhile, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The vehicle travel system 700 is a system that controls the overall driving operation of the vehicle. The vehicle travel system 700 may operate in the autonomous mode.

The vehicle travel system 700 may perform autonomous driving of the vehicle 100 based on location information of the vehicle 100 and navigation information. The vehicle travel system 700 may include a driving system 710, a parking-out system 740, and a parking system 750.

In some embodiments, the vehicle travel system 700 may further include other components in addition to the aforementioned components, or may not include some of the aforementioned component.

Meanwhile, the vehicle travel system 700 may include a processor. Each unit of the vehicle travel system 700 may include its own processor.

Meanwhile, in some embodiments, in the case where the vehicle travel system 700 is implemented as software, the vehicle travel system 700 may be a subordinate concept of the controller 170.

Meanwhile, in some embodiments, the vehicle travel system 700 may be a concept including at least one selected from among the user interface apparatus 200, the object detection apparatus 300, the communication apparatus 400, the vehicle drive apparatus 600, and the controller 170.

The driving system 710 may control the vehicle 100 so that the vehicle 100 autonomously travels.

The vehicle travel system 710 may provide a control signal to the vehicle drive apparatus 600 based on vehicle driving information so as to allow the vehicle to travel. The vehicle drive apparatus 600 may operate based on a control signal provided by the driving system 710. Accordingly, the vehicle 100 may travel autonomously.

For example, the driving system 710 may perform driving of the vehicle 100, by providing a control signal to the vehicle drive apparatus 600 based on information on an object received from the object detection apparatus 300.

The driving system 710 may perform driving of the vehicle 100, by providing a control signal to the vehicle drive apparatus 600 based on a signal from an external device through the communication apparatus 400.

The parking-out system 740 may control the vehicle 100 so that the vehicle 100 exits a parking space.

The parking-out system 740 may provide a control signal to the vehicle drive apparatus 600 based on the vehicle driving information so that the vehicle 100 exits from a parking space. The vehicle drive apparatus 600 may operate based on a control signal provided by the parking-out system 740. Accordingly, the vehicle 100 may automatically exit from a parking space.

For example, the parking-out system 740 may perform an exit maneuver for the vehicle 100, by providing a control signal to the vehicle drive apparatus 600 based on object information received from the object detection apparatus 300.

For example, the parking-out system 740 may perform an exit maneuver for the vehicle 100, by providing a control signal to the vehicle drive apparatus 600 based on a signal received from an external device through the communication apparatus.

The parking system 750 may control the vehicle 100 so that the vehicle 100 is parked automatically.

The parking system 750 may provide a control signal to the vehicle drive apparatus 600 based on vehicle driving information so as to park the vehicle 100. The vehicle drive apparatus 600 may operate based on a control signal provided by the parking system 750. Accordingly, the vehicle 100 may be automatically parked.

For example, the parking system 750 may park the vehicle 100, by providing a control signal to the vehicle drive apparatus 600 based on object information received from the object detection apparatus 300.

For example, the parking system 750 may park the vehicle 100, by providing a control signal to the vehicle drive apparatus 600 based on a signal received from an external device through the communication apparatus 400.

The navigation system 770 may provide navigation information. The navigation information may include at least one selected from among map information, information on a set destination, route information, information on various objects on a road, lane information, traffic information, and location information of a vehicle.

The navigation system 770 may include a memory and a processor. The memory may store navigation information. The processor may control the operation of the navigation system 770.

In some embodiments, the navigation system 770 may update pre-stored information by receiving information from an external device through the communication apparatus 400.

In some embodiments, the navigation system 770 may be classified as a subordinate element of the user interface apparatus 200.

The sensing unit 120 may sense the state of the vehicle. The sensing unit 120 may include an attitude sensor (for example, a yaw sensor, a roll sensor, and a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal. The information acquired by the sensing unit 120 may be included in the vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The power supply unit 190 may supply power required to operate each component under control of the controller 170. In particular, the power supply unit 190 may receive power from, for example, a battery inside the vehicle 100.

The controller 170 may control the overall operation of each unit inside the vehicle 100

The controller 170 may be referred to as an Electronic Controller (ECU).

When the vehicle 100 is in the autonomous mode, the controller 170 may perform autonomous driving of the vehicle 100 based on information acquired by a device provided in the vehicle 100. For example, the controller 170 may control the vehicle 100 based on navigation information provided by the navigation system 770 and information provided by the object detection apparatus 300 and the communication apparatus 400. When the vehicle 100 is in the manual mode, the controller 170 may control the vehicle based on an input signal corresponding to a user command received by the driving manipulation apparatus 500. When the vehicle 100 is in the remote control mode, the controller 170 may control the vehicle 100 based on a remote control signal received by the communication apparatus 400.

Various processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The vehicle 100 according to an embodiment of the present invention may include a driving assistance apparatus 800.

Hereinafter, the driving assistance apparatus 800 will be described with reference to drawings.

Figure 8:
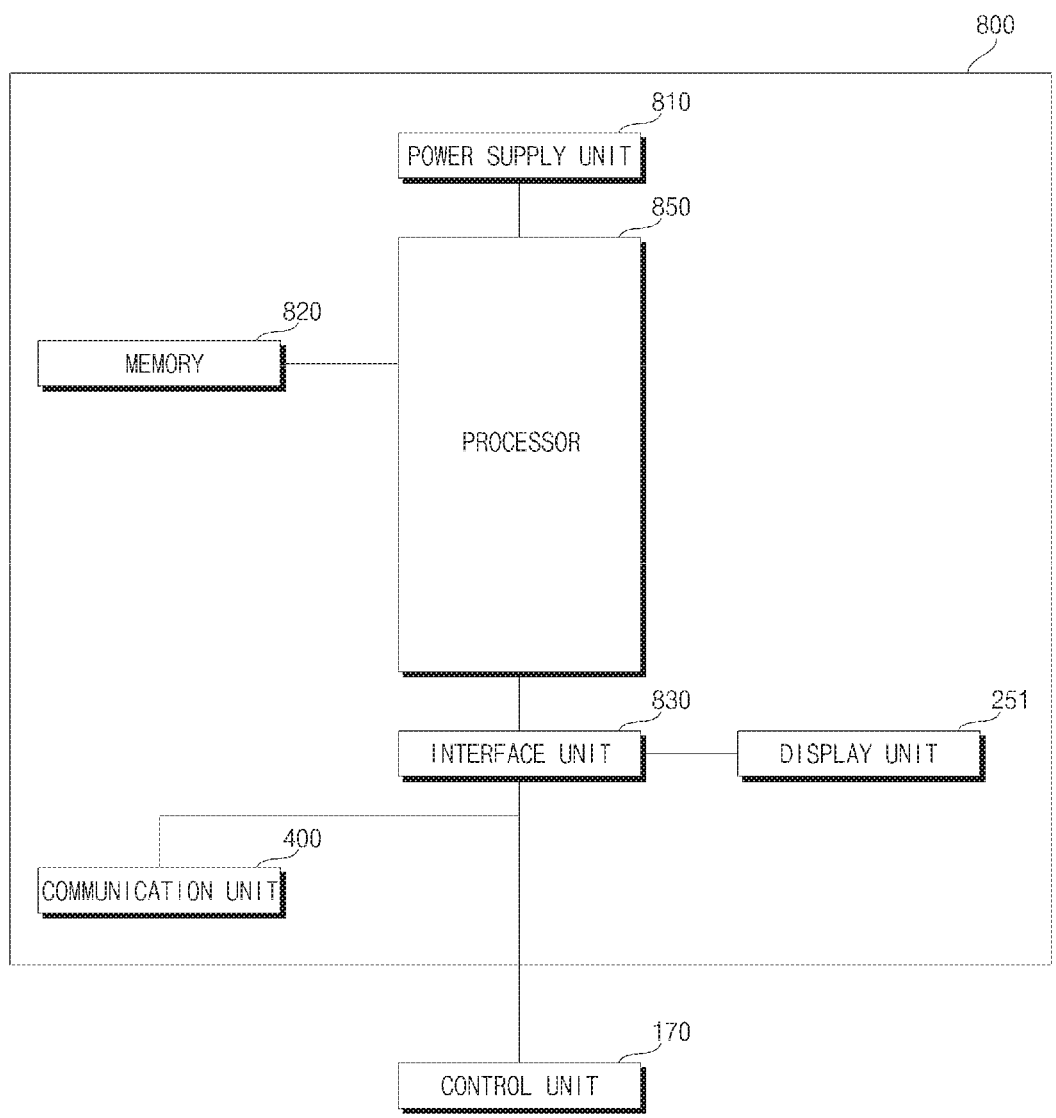
FIG. 8 is a block diagram illustrating the structure of a driving assistance apparatus according to an embodiment of the present invention.

FIG. 8 is a block diagram illustrating the structure of a driving assistance apparatus according to an embodiment of the present invention.

The driving assistance apparatus 800 may include a power supply unit 810, a memory 820, an interface unit 830, a display unit 251, a processor 850, and a communication apparatus 400.

In some embodiments, the driving assistance apparatus 800 may include a communication apparatus which is different from the communication apparatus 400 provided in the vehicle 100.

The power supply unit 810 may supply power to each unit of the driving assistance apparatus 800. The power supply unit 810 may be supplied with power from a battery provided inside the vehicle 100.

The memory 820 may store various types of information related to the driving assistance apparatus 800.

The memory 820 may store data about each unit of the driving assistance apparatus 800, control data for controlling operation of each unit of the driving assistance apparatus 800, and input/output data.

The memory 820 is electrically connected to the processor 850. The memory 820 may provide stored data to the processor 850. The processor 850 may store various types of information in the memory 820.

In some embodiments, the memory 820 may be integrally formed with the processor 850 or may be implemented as a subordinate element of the processor 850.

The memory 820 may store various types of data required for overall operation of the driving assistance apparatus 800, such as a program for processing or controlling by the processor 850.

The memory 820 may be any of various hardware storage devices, such as a ROM, a RAM, an EPROM, a flash drive, and a hard drive.

The interface unit 830 may be electrically connected to the processor 850 and may transmit various types of data transmitted from the outside to the processor 850 or transmit data or a signal transmitted by the processor 850 to the outside.

The processor 850 may transmit a signal through the interface unit 820 to control various devices provided in the vehicle 100. Accordingly, the processor 850 may control various types of devices provided in the vehicle 100.

The interface unit 820 may be electrically controlled to a controller of the vehicle 100. The controller of the vehicle 100 may transmit information provided by each element of the vehicle 100. The interface unit 830 may transmit the various information, received from the controller of the vehicle 100, to the processor 850.

In some embodiments, the interface unit 830 may be connected directly to one or more elements of the vehicle 100 to acquire various types of information.

For example, the interface unit 830 may acquire vehicle driving information through at least one of the user interface apparatus 200, the object detection apparatus 300, the communication apparatus 400, the driving manipulation apparatus 500, the navigation system 770, the sensing unit 120, the controller 170, and the memory 820.

Depending on a type of a providing device, the vehicle driving information may be classified as object information acquired by the object detection apparatus 300, communication information received by the communication apparatus 400 from an external communication apparatus 400, a user input received by the user interface apparatus 200 or the driving manipulation apparatus 500, navigation information provided by the navigation system 770, various types of sensing information provided by the sensing unit 120, and information stored in the memory 820.

Depending on a type of relevant content, the vehicle driving information may be classified as surrounding situation information indicating an environment or situation in the surroundings of the vehicle 100, vehicle state information indicating a state of any of various devices in the vehicle 100, or occupant information about an occupant in the vehicle 100.

For example, the object information acquired by the object detection apparatus 300 is information corresponding to surrounding situation information. For example, out of the communication information received by the communication apparatus 400 from the external communication apparatus 400, information about an area in which the vehicle 100 is now travelling, traffic condition information, and information about a other vehicle are information corresponding to surrounding situation information. For example, out of the navigation information provided by the navigation system 770, map information, traffic information, law information, and location information of the vehicle are information corresponding to surrounding situation information of the vehicle 100.

For example, the vehicle state information may include GPS location information of the vehicle 100, surrounding image information acquired by the camera 310, information about a set path, information about a control state, and information about a driving mode.

The display unit 251 may display graphic objects corresponding various types of information.

The display unit 251 is electrically connected to the interface unit 830 to thereby be controlled in accordance with a control signal from the processor 850. In some embodiments, the display unit 251 may be connected directly to the processor 850.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may be implemented in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, and a region 251g of a window.

In some embodiments, the driving assistance apparatus 800 may include an additional display device which is different from the display unit 251 provided in the vehicle 100.

The communication apparatus 400 may perform V2X communication with an external device located outside of the vehicle 100.

The communication apparatus 400 may include a V2X communication unit 430 that performs V2X communication. The V2X communication unit 430 is a unit for performing communication with a server (referred to as Vehicle to Infra (V2I) communication), communication with another vehicle (referred to as Vehicle to Vehicle (V2V) communication) or communication with a pedestrian (referred to as Vehicle to Pedestrian (V2P) communication). The V2X communication unit 430 may include a radio frequency (RF) circuit that enables implementing V2I communication, V2V communication, and V2P communication protocols.

The communication apparatus 400 may be electrically connected to the interface unit 830. In this case, the communication apparatus 400 may transmit received information or data to the processor 850 through the interface unit 830.

In some embodiments, the communication apparatus 400 may be connected directly to the processor 850. In this case, the communication apparatus 400 may transmit received information or data directly to the processor 850.

In some embodiments, the driving assistance apparatus 800 of the present invention may include a device which performs additional V2X communication with the communication apparatus 400 provided in the vehicle 100.

The processor 850 may control each element of the driving assistance apparatus 800.

The processor 850 may be electrically connected to each element of the driving assistance apparatus 800 to provide a control signal. Each element of the driving assistance apparatus 800 is controlled by a control signal from the processor 850.

The processor 850 may receive data or a signal provided by each element of the driving assistance apparatus 800.

Through the interface unit 830, the processor 850 may receive data or signals from various devices provided in the vehicle 100. For example, the processor 850 may receive object information acquired by the object detection apparatus 300, communication information received by the communication apparatus 400 from the external communication apparatus 400, a user input received by the user interface apparatus 200 or the driving manipulation apparatus 500, various types of sensing information provided by the sensing unit 120, and information stored in the memory 820.

Through the interface unit 830, the processor 850 may transmit a signal for controlling various devices provided in the vehicle 100. For example, through the output unit 250 provided in the vehicle 100, the processor 850 may output various types of alarms. For example, the processor 850 may control the vehicle drive apparatus 600 by transmitting a control signal thereto.

The processor 850 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 9:
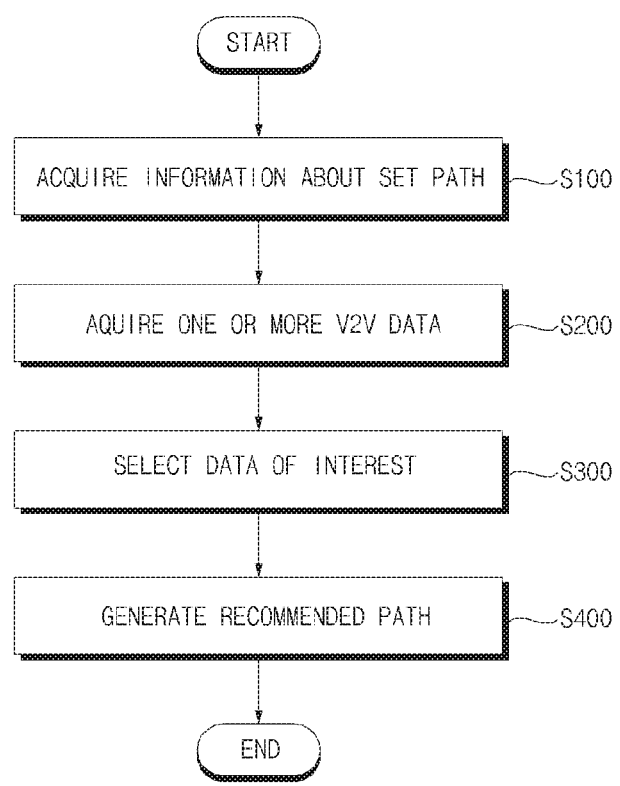
FIG. 9 is a flowchart illustrating operation of a driving assistance apparatus according to an embodiment of the present invention.
Figure 10:
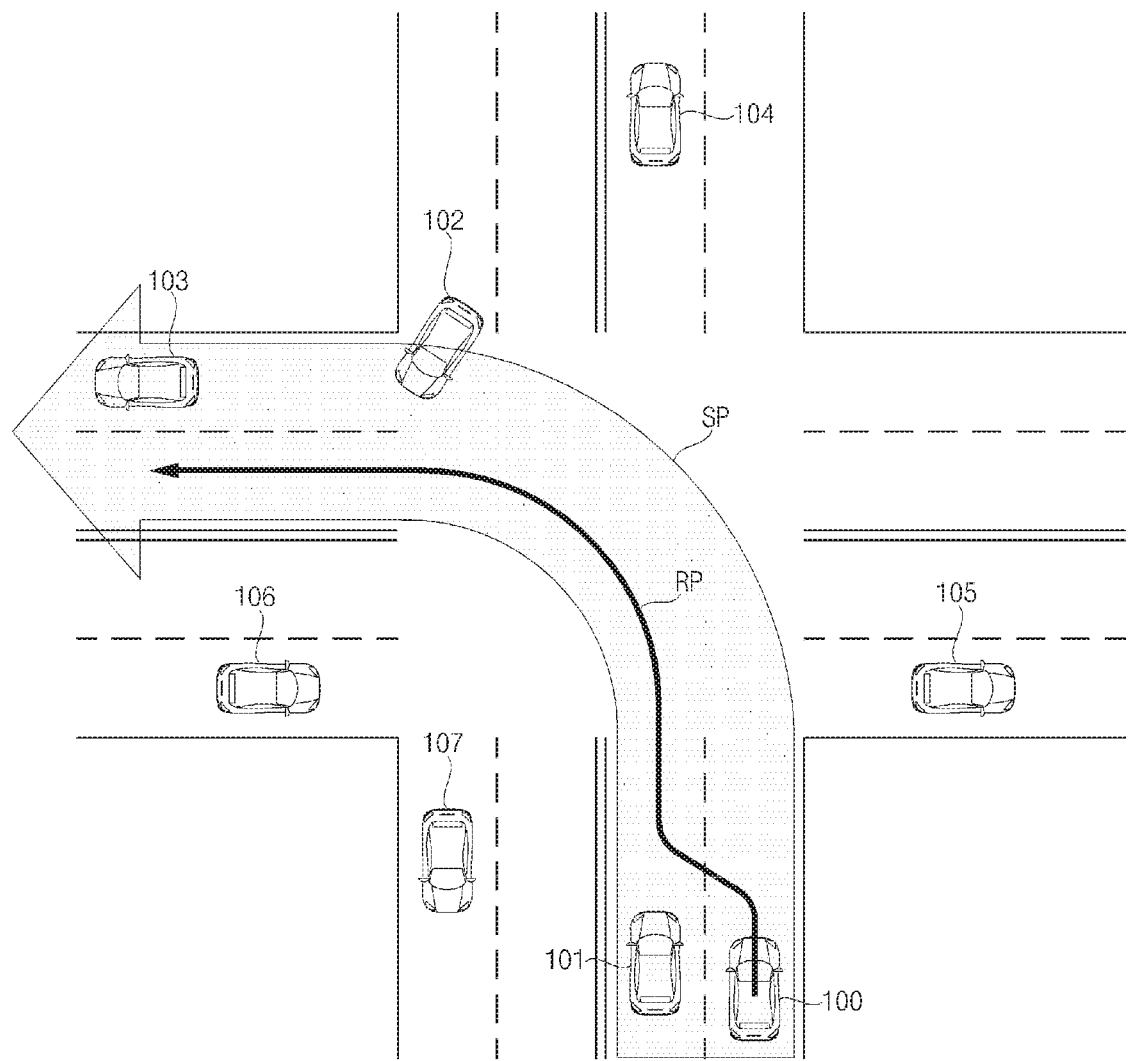
FIG. 10 is a diagram illustrating how a driving assistance apparatus according to an embodiment of the present invention sets a lane-level recommended path using a road-level set path.

FIG. 9 is a flowchart illustrating operation of a driving assistance apparatus according to an embodiment of the present invention. FIG. 10 is a diagram illustrating how a driving assistance apparatus according to an embodiment of the present invention sets a lane-level recommended path using a road-level set path.

Referring to FIGS. 9 and 10, operation of the driving assistance apparatus 800 will be described.

The processor 850 acquires information about a set path for the vehicle 100 in S100.

The set path for the vehicle 100 include a path previously travelled by the vehicle 100 and a predicted path to be travelled by the vehicle 100.

The set path for the vehicle 100 is a path with road-level precision.

Precision of a path is a degree of how detailed the path is presented on the map. For example, precision of a path may be expressed either as road level or lane level.

FIG. 10 shows a set path with road-level precision, and a recommended path with lane-level precision.

When a set path SP has road-level precision, the set path SP is displayed as a road on the map. In this case, a road to be travelled by the vehicle 100 may be displayed on the map, but a lane to be travelled by the vehicle 100 is not displayed.

Based on information about the set path SP, the processor 850 may determine which road the vehicle 100 needs to travel.

However, when the road includes multiple lanes, the processor 850 is not able to determine which lane the vehicle 100 needs to travel, based on the information about the set path SP.

That is, the processor 850 may determine only a road-level set path SP, based on the information about the set path SP which is presented with road-level precision.

Lane-level precision is greater than road-level precision.

A path with Lane-lever precision is more detailed than a path with road-level precision.

When a recommended path RP is presented with lane-level precision, the processor 850 may determine which lane the vehicle 100 needs to travel, based on information about the recommended path RP.

That is, when the recommended path RP has road-level precision, the processor 850 may determine a lane-level recommended path RP, based on information about the recommended path RP.

At least one of the navigation system 770, the driving system 710, and the controller 170 may generate information about a set path for the vehicle 100. At least one of the navigation system 770, the driving system 710, and the controller 170 may provide the information about a set path for the vehicle 100 to the processor 850.

Through the interface unit 830, information about a set path, the processor 850 may acquire which is provided by at least one of the navigation system 770, the driving system 710, and the controller 170.

Through the communication apparatus 400, the processor 850 may receive V2V data transmitted by one or more other vehicles in S200.

In some embodiments, step S100 and Step S200 may be performed simultaneously or may be in reverse order of the drawing.

While travelling, the vehicle 100 or other vehicle may broadcast V2V data within a preset range of distance. Accordingly, the vehicle 100 may receive V2V data broadcasted by the other vehicle.

V2V data may include information about a vehicle which has transmitted the V2V data, or may be information acquired by the vehicle 100 or the other vehicle while travelling.

For example, the V2V data may be a Basic Safety Message (BSM).

For example, the V2V data may include GPS location information of a vehicle which has transmitted the V2V data, speed information, information about a set path, information about an error state, information about a control state, and information about a driving mode.

For example, the V2V data may include surrounding image information acquired by a vehicle which has transmitted the V2V data, sensing information, traffic information, and surrounding situation information.

Referring to FIG. 10, the vehicle 100 and a plurality of other vehicles 101 to 107 broadcast their respective V2V data. Accordingly, through the communication apparatus 400, the processor 850 may receive, V2V data respectively broadcasted by the plurality of other vehicles 101 to 107.

The processor 850 may select data of interest from one or more V2V data in S300.

Based on information about a set path and one or more V2V data, the processor 850 may select, from the one or more V2V data, data of interest which is V2V data transmitted by a vehicle of interest which is a other vehicle located on the set path.

Based on the information about the set path and the one or more V2V data, the processor 850 may determine whether or not a vehicle of interest located on the set path exists.

When it is determined that the vehicle of interest located on the set path exists, the processor 850 may determine that V2V data transmitted by the vehicle of interest is data of interest. When it is determined that the vehicle of interest located on the set path exists, the processor 850 may filter out V2V data other than the V2V data transmitted by the vehicle of interest.

Referring to FIG. 10, based on V2V data respectively broadcasted by a plurality of other vehicles 101 to 107, the processor 850 may determine respective transmission locations of a plurality of V2V data.

Vehicles of interest located on the set path SP among the plurality of other vehicles 101 to 107 are a first other vehicle 101, a second other vehicle 102, and a third other vehicle 103.

Based on V2V data respectively transmitted by the first other vehicle 101, the second other vehicle 102, and the third other vehicle 103, the processor 850 may determine that the first other vehicle 101, the second other vehicle 102, and the third other vehicle 103 are vehicles of interest located on the set path SP.

The processor 850 may select the V2V data, which are respectively transmitted by the first other vehicle 101, the second other vehicle 102, and the third other vehicle 103, as data of interest.

The processor 850 may filter out V2V data transmitted by the other vehicles 104 to 107 other than the first other vehicle 101, the second other vehicle 102, and the third other vehicle 103.

The processor 850 may set a recommended path for the vehicle 100 based on the data of interest in S400.

The recommended path set by the driving assistance apparatus 800 is a path with lane-level precision. The lane-level precision is greater than road-level precision.

When the recommended path RP has lane-level precision, the processor 850 may determine which lane the vehicle 100 needs to travel, based on information about the recommended path RP.

That is, when the recommended path RP has lane-level precision, the processor 850 may determine a lane-level recommended path RP based on information about the recommended path RP.

A method of setting a recommended path will be described later in more detail with reference to FIG. 11.

Referring to FIG. 10, the processor 850 may determine a recommended path RP based on V2V data respectively transmitted by the first other vehicle 101, the second other vehicle 102, and the third other vehicle 103.

Figure 11:
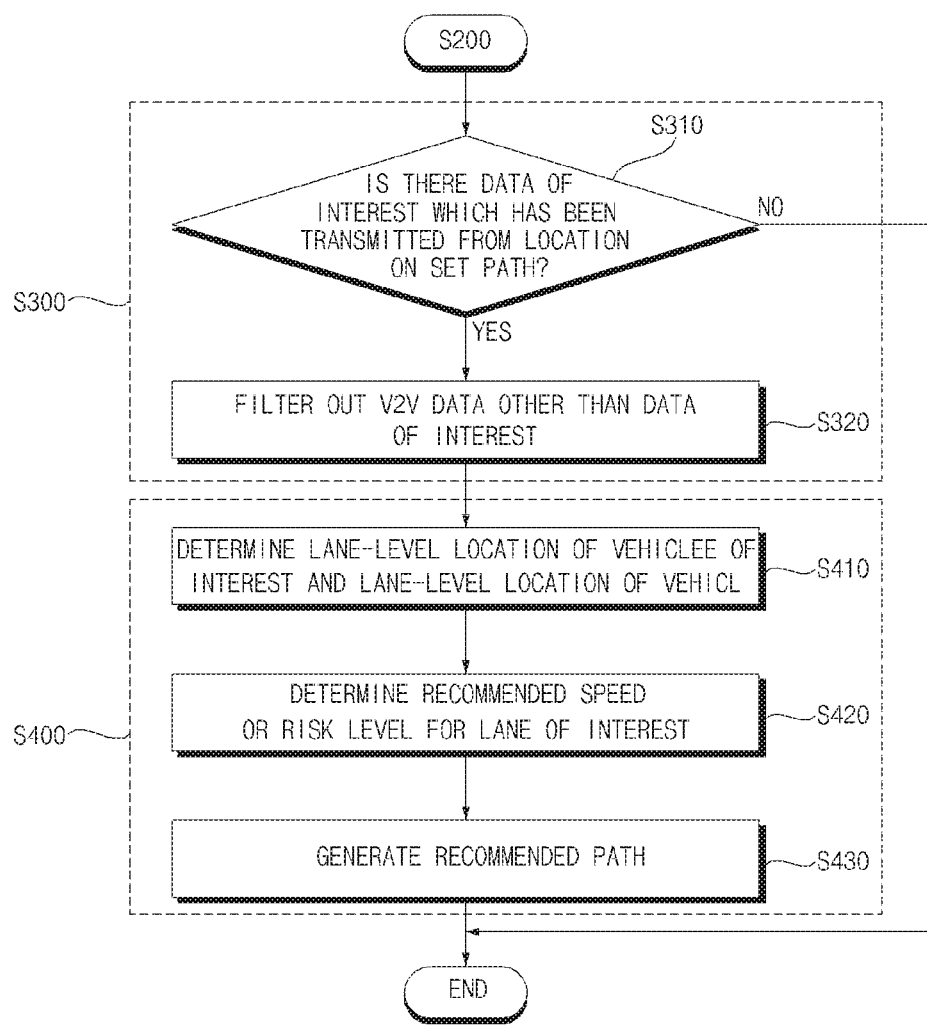
FIG. 11 is a flowchart illustrating a procedure by which a driving assistance apparatus according to an embodiment of the present invention selects data of interest and sets a recommended path.

FIG. 11 is a flowchart illustrating a procedure by which the driving assistance apparatus according to an embodiment of the present invention selects data of interest and sets a recommended path.

The processor 850 may acquire information about a set path for the vehicle 100 and V2V data respectively transmitted by one or more other vehicles in S200.

One or more V2V data may include GPS location information of vehicles which have respectively transmitted the one or more V2V data.

In S310, the processor 850 may determine whether data of interest exists in one or more V2V data, based on GPS location information included in each of the one or more V2V data.

Based on information about a set path and the GPS location information included in each of the one or more V2V data, the processor 850 may determine whether data of interest which has been transmitted from a location on the preset path exists in the one or more V2V data.

When such data of interest exists, the processor 850 filters out data other than the data of interest from the one or more V2V data in S320.

The driving assistance apparatus 800 reduces load of received data, by filtering out V2V data other than data of interest when setting a recommended path.

The processor 850 determines a lane-level location of a vehicle of interest and a lane-level location of the vehicle 100 in S410.

The processor 850 may determine the lane-level location of the vehicle of interest based on the data of interest.

The one or more V2V data may include GPS location information of each of the one or more other vehicles which have respectively transmitted the one or more V2V data, and surrounding image information acquired by each of the one or more other vehicles. Accordingly, the data of interest may include GPS location information of a vehicle of interest which has transmitted data of interest, and surrounding image information acquired by the vehicle of interest.

The GPS location information may be given with road-level precision. Accordingly, when determining a location of a vehicle using the GPS location information, the processor 850 is able to determine which road the vehicle is located, but unable to determine which lane the vehicle is located.

That is, when determining a location of a vehicle based on general GPS location information, it is not possible to determine which lane the vehicle is located. Thus, the driving assistance apparatus 800 utilizes GPS location information and surrounding image information in order to determine a road and a lane in which the vehicle is located.

The processor 850 may determine a lane-level location of a vehicle of interest based on GPS location information and surrounding image information of the vehicle of interest included in data of interest.

To this end, the processor 850 may determine a road-level location of the vehicle of interest, based on GPS location information of the vehicle of interest. The processor 850 may determine which lane the vehicle of interest is located, based on the determined road-level location of the vehicle of interest and surrounding image information acquired by the vehicle of interest. Accordingly, the processor 850 may determine a lane-level location of the vehicle of interest.

The surrounding image information may be information about images acquired by one or more cameras provided in the vehicle 100. For example, the surrounding image information may be information about images acquired by at least one of a front camera, a rear camera, and a side camera of the vehicle 100.

The processor 850 may determine a lane-level location of the vehicle 100 based on vehicle state information.

The interface unit 830 may acquire the vehicle state information from various devices provided in the vehicle 100. The vehicle state information may include GPS location information of the vehicle 100, and surrounding image information acquired by the camera 310 provided in the vehicle 100. For example, the interface unit 830 may acquire the surrounding image information of the vehicle 100 from the camera 310. For example, the interface unit 830 may acquire GPS location information of the vehicle 100 from the navigation system 770 or the location information unit 420.

The interface unit 830 may transmit, to the processor 850, vehicle state information which indicates a state of any of various devices included in the vehicle 100.

The processor 850 may acquire, through the interface unit 830, the vehicle state information from any of various devices included in the vehicle 100.

The processor 850 may determine a lane-level location of the vehicle 100 based on GPS location information and surrounding image information of the vehicle 100 included in the vehicle state information.

To this end, the processor 850 may determine a road-level location of the vehicle 100 based on the GPS location information of the vehicle 100. The processor 850 may determine which lane the vehicle 100 is located on the road, based on the road-level location of the vehicle 100 and surrounding image information acquired by the camera 310. Accordingly, the processor 850 may determine the lane-level location of the vehicle 100.

Based on a determined lane-level location determined for a vehicle of interest, a determined lane-level location of the vehicle 100, data of interest, and vehicle state information, the processor 850 may determine a recommended speed or risk level for a lane in which the vehicle of interest is located (hereinafter, referred to as a "lane of interest) in S420.

The data of interest may include at least one of information about the vehicle of interest and information acquired by the vehicle of interest.

For example, data of interest may include GPS location information of a vehicle of interest which transmits data of interest, speed information of the vehicle of interest, information about a set path of the vehicle of interest, information about an error state of the vehicle of interest, information about a control state of the vehicle of interest, and information about a driving mode of the vehicle of interest.

For example, data of interest may include surrounding image information acquired by a vehicle of interest which transmits the data of interest, sensing information acquired by the vehicle of interest, traffic information acquired by the vehicle of interest, and information about a surrounding situation acquired by the vehicle of interest.

The processor 850 may determine at least one of a recommended speed and a risk level for a lane of interest, based on at least one of the following: speed information of a vehicle of interest included in data of interest, information about an error state, information about a control sate, information about a driving mode, sensing information, traffic information, and information about a surrounding situation.

The recommended speed may be a speed at which the vehicle 100 can travel safely in a specific lane without colliding with any other vehicle.

The risk level may correspond to a value which corresponds to a probability for the vehicle 100 to collide with an object in a specific lane.

For example, the risk may be expressed as a numerical number which indicates a dangerous degree of a corresponding lane. For example, the risk may be expressed in a range of numerical values between 0 and 2. In this case, a greater value may indicate a higher risk.

A method of determining a recommended speed or risk level for a lane of interest will be described later in more detail with reference to FIG. 14.

When a road corresponding to a set path is determined to be a multilane road, the processor 850 may determine a recommended speed or risk level for each lane of the multilane road, based on a determined lane-level location of a vehicle of interest, a determined lane-level location of the vehicle 100, data of interest, and vehicle state information.

Based on surrounding situation information, the processor 850 may determine whether the road corresponding to the set path is a multilane road.

The surrounding situation information is information indicating an environment or situation in the surroundings of a vehicle. For example, object information acquired by the object detection apparatus 300 corresponds to the surrounding situation information. For example, out of communication information received by the communication apparatus 400 from the external communication apparatus 400, information about an area in which the vehicle 100 is travelling, traffic condition information, and information about an other vehicle correspond to the surrounding situation information. For example, out of navigation information provided by the navigation system 770, map information, traffic information, law information, and location information of the vehicle 100 correspond to the surrounding situation information.

The interface unit 830 may acquire the surrounding situation information from various devices included in the vehicle 100, and transmit the acquired surrounding situation information to the processor 850.

In S430, the processor 850 may set a recommended path, based on a determined lane-level location of the vehicle 100 and a recommended speed or risk level for a lane of interest.

When the road corresponding to the set path is a multilane road, the processor 850 may set a recommended path, based on the determined lane-level location of the vehicle 100 and a recommended speed or risk level for each lane of the multilane road.

For example, when a driving mode of the vehicle 100 is determined to be a speed mode based on vehicle driving information, the processor 850 may set a path, which has the highest recommended speed among multiple lanes, as a recommended path, based on a recommended speed for each lane of the multilane road.

The vehicle state information may include information about a driving mode of the vehicle 100. For example, the driving mode of the vehicle 100 may include a speed mode in which the vehicle 100 can reach a destination as fast as possible, and a safe mode in which the vehicle 100 can travel as safely as possible.

For example, when the driving mode of the vehicle 100 is determined to be the safe mode based on vehicle driving information, the processor 850 may set a path, which has the lowest risk level among multiple lanes, as a recommended lane, based on respective risk levels for the multiple lanes.

The processor 850 may display the recommended path on the display unit 251.

For example, the processor 850 may display, on the display unit 251, a map image which indicates the recommended path.

For example, the processor 850 may display an arrow or a guideline, which indicates the recommended path, with augmented reality on a transparent display provided in the windshield. In this case, a driver of the vehicle may recognize such that the image indicating the recommended path is displayed on the road.

When a recommended speed for each lane included in a set path is determined, the processor 850 may display the recommended speed on the display unit 251.

The processor 850 may display, on the display unit 251, a lane in which the vehicle 100 is travelling among multiple lanes and a recommended speed for the lane. For example, when the vehicle 100 is in the manual mode, the processor 850 may display, on the display unit 251, a recommended speed for the lane in which the vehicle 100 is travelling.

The processor 850 may control the vehicle drive apparatus 600 so that a speed of the vehicle 100 becomes the recommended speed for the current lane of travel in which the vehicle 100 is travelling among one or more lanes. For example, when the vehicle 100 is in the autonomous mode, the processor 850 may control the vehicle drive apparatus 600 so that the vehicle 100 travels at the recommended speed for the current lane of travel.

When risk levels for one or more lanes included in a set path is determined, the processor 850 may display the respective risk levels on the display unit 251.

The processor 850 may display, on the display unit 251, a risk level for the current lane of travel in which the vehicle 100 is travelling among one or lanes included in the set path.

FIGS. 12 and 13 are diagrams illustrating a road-level location and a lane-level location.

Figure 12A:
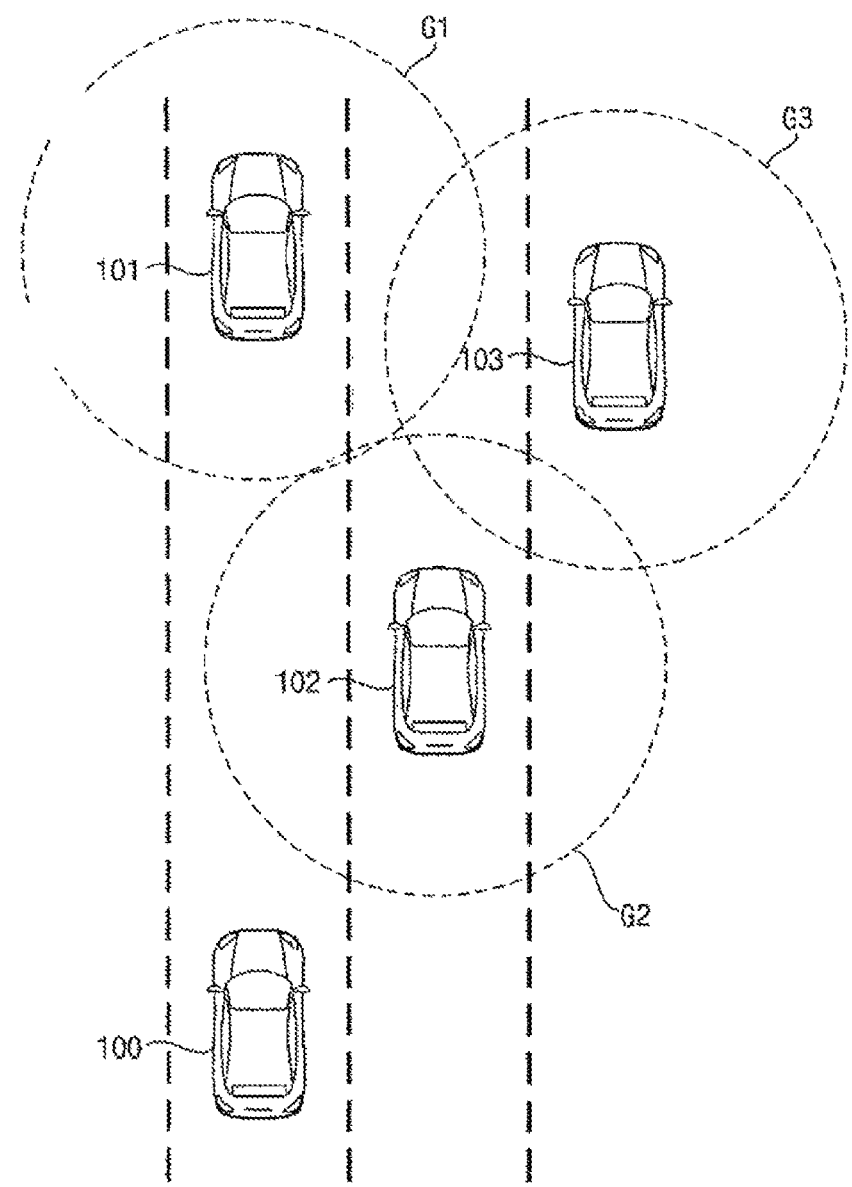
FIGS. 12A, 12B, 13A, 13B are diagrams illustrating a road-level location and a lane-level location.

FIG. 12A shows an example in which GPS location information is given with road-level precision.

As GPS location information provided by the first vehicle 101 is given with road-level precision, a location indicated by the GPS location information provided by the first vehicle 101 may be represented as a first region G1. As GPS location information provided by the second vehicle 102 is given with road-level precision, a location indicated by the GPS location information provided by the second vehicle 102 may be represented as a second region G2. As GPS location information provided by the third vehicle 103 is given with road-level precision, a location indicated by the GPS location information provided by the third vehicle 103 may be represented as a third region G3.

Figure 12B:
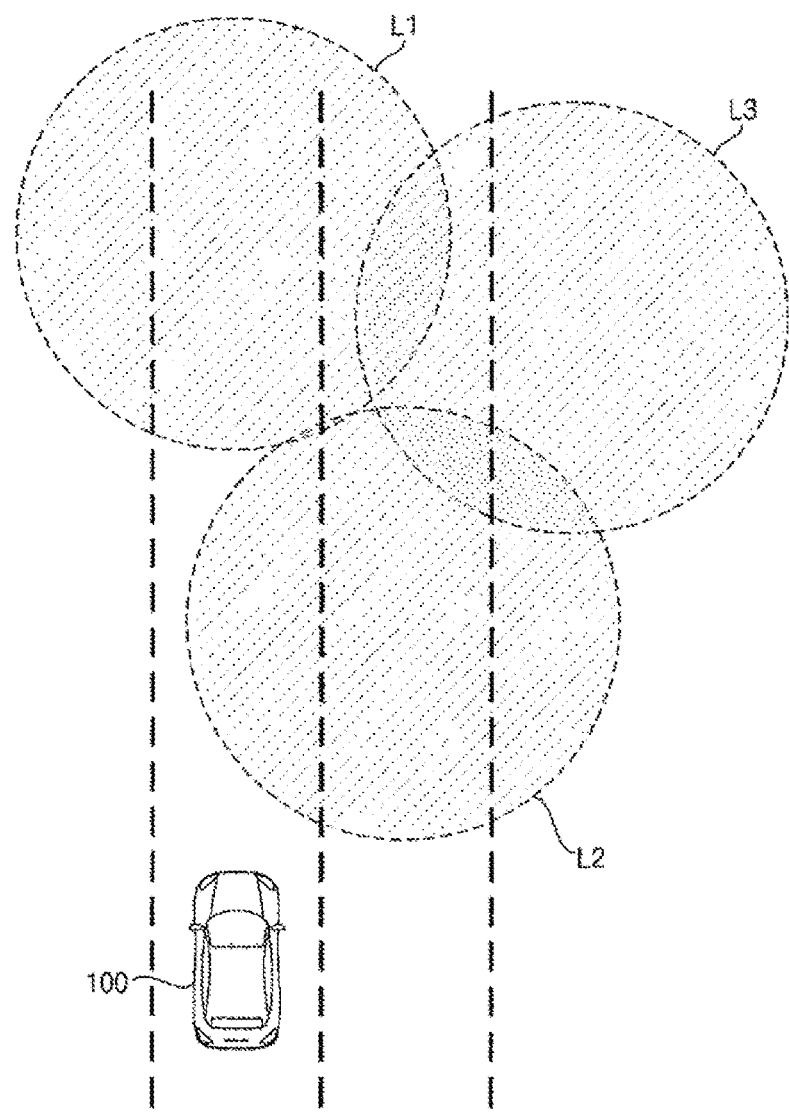

FIG. 12B shows locations of other vehicles determined by the processor 850.

The processor 850 may determine a road-level location of each of the first, second, and third vehicles 101, 102, and 103 based on the GPS information provided by each of them.

As the GPS location information provided by the first vehicle 101 is given with road-level precision, the processor 850 may determine that the first vehicle 101 exists in a first region L1, based on the GPS location information provided by the first vehicle 101.

As the GPS location information provided by the second vehicle 102 is given with road-level precision, the processor 850 may determine that the second vehicle 102 exists in a second region L2, based on the GPS location information provided by the second vehicle 102.

As the GPS location information provided by the third vehicle 103 is given with road-level precision, the processor 850 may determine that the third vehicle 103 exists in a third region L3, based on the GPS location information provided by the third vehicle 103.

Accordingly, using GPS location information, the processor 850 is able to determine which road each vehicle is located, but unable to determine which lane each vehicle is located. The driving assistance apparatus 800 according to the present invention may determine which lane an other vehicle is located, based on GPS location information and surrounding image information.

Figure 13A:
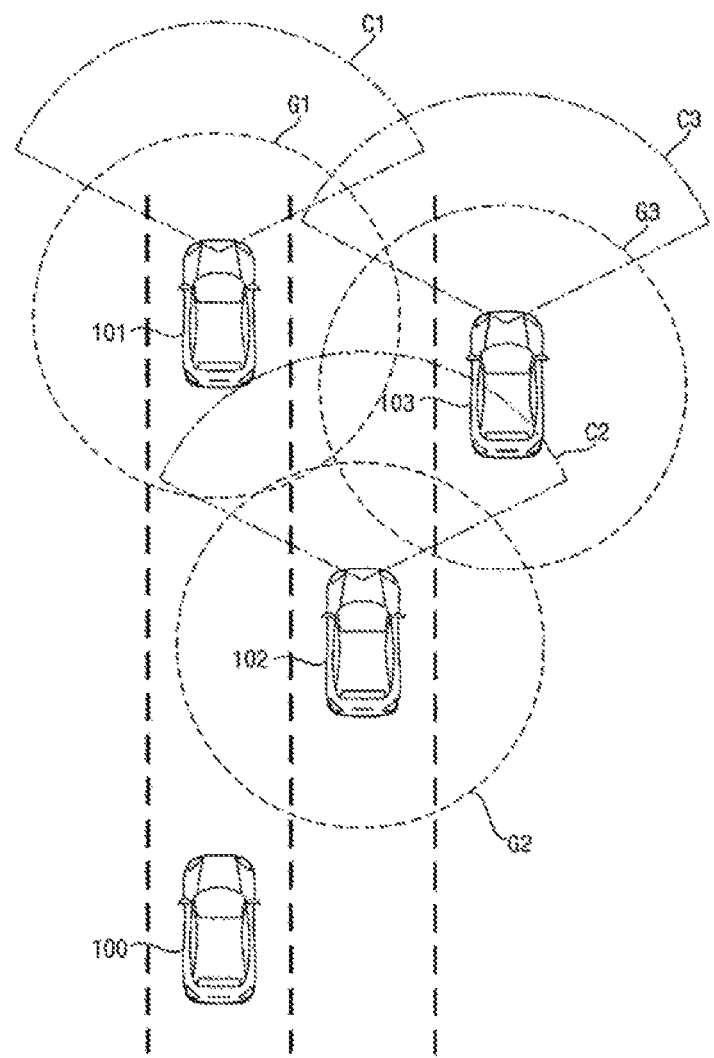

FIG. 13A shows regions G1, G2, and G3 indicating precision of GPS location information, and fields of view C1, C2, and C3 of front cameras of vehicles.

In the drawing, the first vehicle 101, the second vehicle 102, and the third vehicle 103 acquire front images using front cameras. In some embodiments, however, the first vehicle 101, the second vehicle 102, and the third vehicle 103 may acquire image using side or rear cameras in some embodiments.

The first vehicle 101, the second vehicle 102, and the third vehicle 103 may broadcast information about the acquired front images as V2V data.

The processor 850 may acquires front image information broadcasted by each of the first vehicle 101, the second vehicle 102, and the third vehicle 103.

Figure 13B:
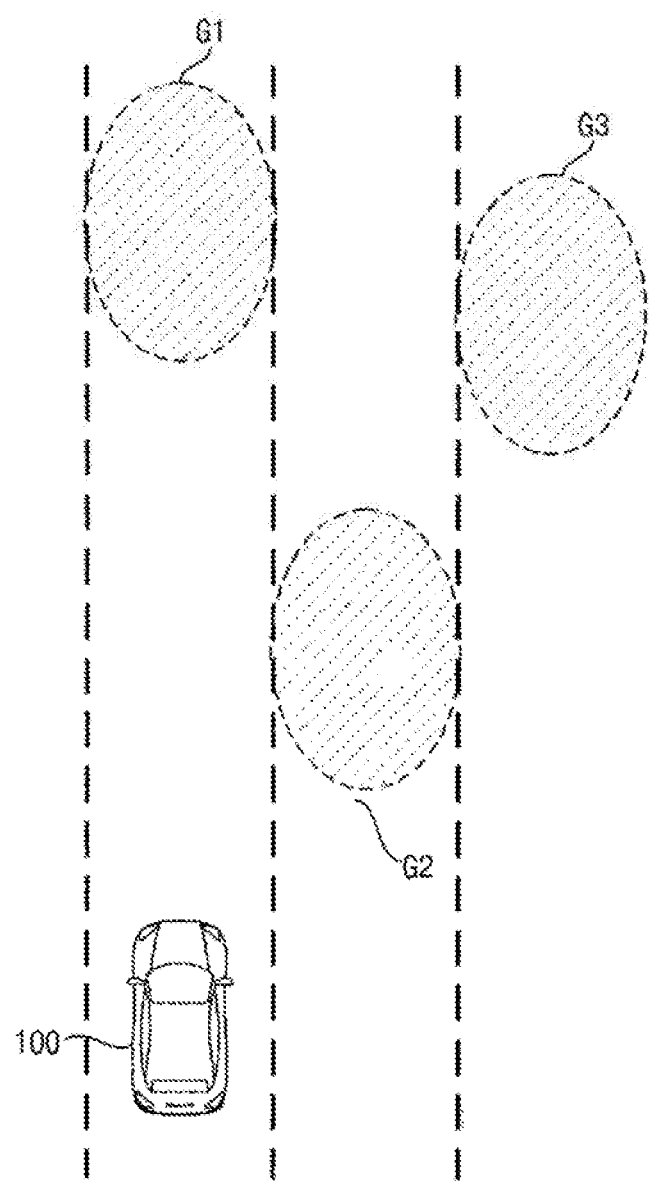

FIG. 13B shows locations of other vehicles determined by the processor 850.

The processor 850 may determine a lane-level location of each of the first vehicle 101, the second vehicle 102, and the third vehicle 103, based on GPS location information and image information provided by each of them.

The processor 850 may determine that the first vehicle 101 exists in the first region G1, based on GPS location information and front image information provided by the first vehicle 101. Accordingly, the processor 850 may determine that the first vehicle 101 is located in a second lane.

The processor 850 may determine that the second vehicle 102 exists in the second region G2, based on GPS location information and front image information provided by the second vehicle 102. Accordingly, the processor 850 may determine that the second vehicle 102 is located in a third lane.

The processor 850 may determine that the third vehicle 103 exists in the third region G3, based on GPS location information and front image information provided by the third vehicle 103. Accordingly, the processor 850 may determine the third vehicle 103 is located in a fourth lane.

Figure 14:
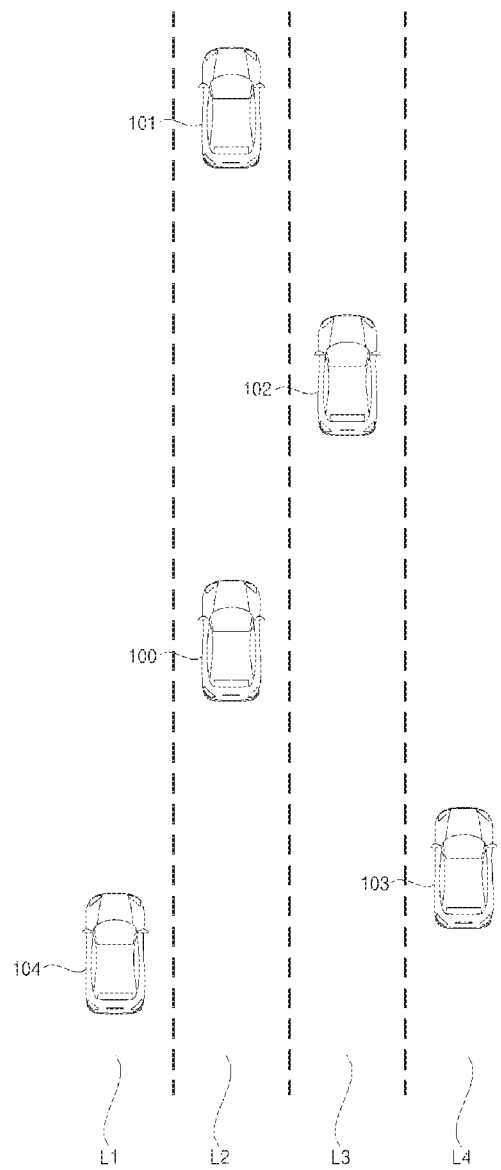
FIG. 14 is a diagram illustrating a driving assistance apparatus according to an embodiment of the present invention determines a recommended speed or risk level for each of multiple lanes.

FIG. 14 is a diagram illustrating how a driving assistance apparatus according to an embodiment of the present invention determines a recommended speed or risk level for each lane of a multilane road.

In the example of FIG. 14, a first vehicle 101, a second vehicle 102, a third vehicle 103, and a fourth vehicle 104 are located on a road corresponding to a set path and therefore considered to be vehicles of interest. Because the set path includes a previous road travelled by the vehicle 100 and a predicted road to be travelled by the vehicle 100, the third vehicle 103 and the fourth vehicle 104 located behind the vehicle 100 are vehicles of interest.

Vehicle state information may include speed information of the vehicle 100. Data of interest may include speed information of a vehicle of interest.

The processor 850 may determine a speed of the vehicle 100 based on the speed information of the vehicle 100.

In some embodiments, the processor 850 may determine a speed of each of the first vehicle 101, the second vehicle 102, the third vehicle 103, and the fourth vehicle 104 based on speed information provided by each of them.

The processor 850 may determine a risk level for each lane of a multilane road lanes based on a determined lane-level location of a vehicle of interest, a determined lane-level location of the vehicle 100, the speed information of the vehicle 100, and the speed information of the vehicles of interest.

When a vehicle of interest is determined to be located behind the vehicle 100, the processor 850 may determine that a risk level for a lane in which the vehicle of interest is located is proportional to a value obtained by subtracting the speed of the vehicle 100 from a speed of the vehicle of interest.

For example, when a value obtained by subtracting the speed of the vehicle 100 from a speed of a vehicle of interest located behind the vehicle 100 is a positive value greater than a first reference value, the processor 850 may determine that a lane in which the vehicle of interest is located has the highest risk level. For example, the highest risk level may be represented as 2.

For example, when a value obtained by subtracting the speed of the vehicle 100 from a speed of vehicle of interest located behind the vehicle 100 is a positive value which is equal to or smaller than the first reference value and greater than the second reference value, the processor 850 may determine that a lane in which the vehicle of interest is located has a normal risk level. For example, the normal risk level may be represented as 1.

For example, when a value obtained by subtracting the speed of the vehicle 100 from a speed of a vehicle of interest located behind the vehicle 100 is 0 or a negative value, the processor 850 may determine that a lane in which the vehicle of interest is located has the lowest risk level. For example, the lowest risk level may be represented as 0.

The first reference value and the second reference value may be determined through experiments or may be set by a user. Associated data may be stored in the memory 820.

In the example of FIG. 14, the processor 50 may determine that the third vehicle 103 and the fourth vehicle 104 are located behind the vehicle 100, based on surrounding situation information or data of interest.

The processor 850 may perform a calculation of subtracting the speed of the vehicle 100 from a speed of the third vehicle 103. The processor 850 may determine that a risk level for the fourth lane L4 in which the third vehicle 103 is located is proportional to a value obtained by subtracting the speed of the vehicle 100 from the speed of the third vehicle 103. Accordingly, when the vehicle 100 is travelling at a constant speed, the processor 850 may determine such that the faster speed of the third vehicle 103, the higher risk level for the fourth lane L4. In addition, when the third vehicle 103 is travelling at a constant speed, the processor 850 may determine such that the slower speed of the vehicle 100, the higher risk level for the fourth lane L4.

The processor 850 may perform a calculation of subtracting the speed of the vehicle 100 from a speed of the fourth vehicle 104. The processor 850 may determine that a risk level for the first lane L1 in which the fourth vehicle 104 is located is proportional to a value obtained by subtracting the speed of the vehicle 100 from the speed of the fourth vehicle 104. Accordingly, when the vehicle 100 is travelling at a constant speed, the processor 850 may determine such that the faster speed of the fourth vehicle 104 behind the vehicle 100, the higher risk level for the first lane L1. In addition, when the fourth vehicle 104 is travelling at a constant speed, the processor 850 may determine such that the slower speed of the vehicle 100, the higher risk level for the first lane L1.

When a vehicle of interest is determined to be located ahead of the vehicle 100, the processor 850 may determine that a risk level for a lane in which the vehicle of interest is located is proportional to a value obtained by subtracting the speed of the vehicle of interest from a speed of the vehicle 100.

For example, when a value obtained by subtracting the speed of the vehicle of interest located ahead of the vehicle 100 from a speed of a vehicle 100 is a positive value greater than a first reference value, the processor 850 may determine that a lane in which the vehicle of interest is located has the highest risk level. For example, the highest risk level may be represented as 2.

For example, when a value obtained by subtracting the speed of the vehicle of interest located ahead of the vehicle 100 from a speed of a vehicle 100 is a positive value which is equal to or smaller than the first reference value and greater than a second reference value, the processor 850 may determine that a risk level for a lane in which the vehicle of interest is located has a normal risk level. For example, the normal risk level may be represented as 1.

For example, when a value obtained by subtracting the speed of the vehicle of interest located ahead of the vehicle 100 from a speed of a vehicle 100 is 0 or a negative value, the processor 850 may determine that a lane in which the vehicle of interest is located has the lowest risk level. For example, the lowest risk level may be represented as 0.

The first reference value and the second reference value may be determined through experiments or may be set by a user. Associated data thereof may be stored in the memory 820.

In the example of FIG. 14, the processor 850 may determine that the first vehicle 101 and the second vehicle 102 are located ahead of the vehicle 100, based on surrounding situation information or data of interest.

The processor 850 may perform a calculation of subtracting a speed of the first vehicle 101 by the speed of the vehicle 100. The processor 850 may determine that a risk level for the second lane L2 in which the first vehicle 101 is located is proportional to a value obtained by subtracting the speed of the vehicle 100 from the speed of the first vehicle 101. Accordingly, when the vehicle 100 is travelling at a constant speed, the processor 850 may determine such that the slower speed of the first vehicle 101, the higher risk level for the second lane L2. In addition, when the first vehicle 101 is travelling at a constant speed, the processor 850 may determine such that the faster speed of the vehicle 100, the higher risk level for the second lane L2.

The processor 850 may perform a calculation of subtracting a speed of the second vehicle 102 from the speed of the vehicle 100. The processor 850 may determine that a risk level for the third lane L3 in which the second vehicle 102 is located is proportional to a value obtained by subtracting the speed of the second vehicle 102 from the speed of the vehicle 100. Accordingly, when the vehicle 100 is travelling at a constant speed, the processor 850 may determine such that the slower speed of the second vehicle 102, the higher risk level for the third lane L3. In addition, when the second vehicle 102 is travelling at a constant speed, the processor 850 may determine such that the faster speed of the vehicle 100, the higher risk level for the third lane L3.

Unlike the example of FIG. 14, when it is determined, based on surrounding situation information or data of interest, that there is a lane in which no vehicle is located, the processor 850 may determine that the lane has the lowest risk level. The lane in which no vehicle is located is safer than a lane in which other vehicle is located, and thus, the lane in which no vehicle is located may have a lower risk level.

According to another embodiment of the present invention, the processor 850 may determine a risk level for a lane of interest, by taking into consideration respective set paths for the vehicle 100 and a vehicle of interest.

Vehicle state information may include information about a set path and a control state of the vehicle 100 (hereinafter, referred to as "first information").

The information about a control state may indicate a control state of any of various devices provided in the vehicle 100. For example, information about a control state of the vehicle 100 may indicate at least one of a speed, a braked-state, a braking force, and a steering angle of the vehicle 100.

Data of interest may include information about a set path and a control sate of a vehicle of interest (hereinafter, referred to as "second information").

The processor 850 may determine a risk level for each lane of a multilane road, based on a determined lane-level location determined for the vehicle of interest, a determined lane-level location of the vehicle 100, the first information, and the second information.

The processor 850 may determine a predicted path to be travelled by the vehicle 100 for a specific period of time, based on a determined lane-level location of the vehicle 100 and the first information. For example, the processor 850 may determine a predicted path to be travelled by the vehicle 100 for about two or three seconds, based on the current location of the vehicle 100 and first information which is about a set path and a control state of the vehicle 100.

The processor 850 may determine a predicted path to be travelled by a vehicle of interest, based on a determined lane-level location of the vehicle of interest and the second information provided by the vehicle of interest. For example, the processor 850 may determine a predicted path to be travelled by the vehicle of interest for about two or three seconds, based on the current location of the vehicle of interest and the second information which is about a set path and a control state of the vehicle of interest.

When it is determined that a predicted path for the vehicle 100 and a predicted path for the vehicle of interest overlap each other within a specific period of time, the processor 850 may determine that a lane including a location at which the predicted path for the vehicle 100 and the predicted path for the vehicle of interest overlap has the highest risk level.

The processor 850 may determine a location of predicted collision between the vehicle 100 and the vehicle of interest, based on the predicted path for the vehicle 100 and the predicted path for the vehicle of interest. The processor 850 may determine that a lane including the location of predicted collision between the vehicle 100 and the vehicle of interest has the highest risk level.

For example, when it is determined that the vehicle 100 is going to make a lane change and that a vehicle behind the vehicle 100 in the same lane is going to make a lane change in the same direction, the processor 850 may determine that a lane to which the vehicle 100 is going to move has the highest risk level.

For example, when it is determined that the vehicle 100 is going to move to a particular lane and that a vehicle of interest travelling in a next-next lane is also going to move to the particular lane, the processor 850 may determine that the particular lane has the highest risk level.

In the example of FIG. 14, when it is determined, based on, based on information about a set path and a control state of the second vehicle 102, that the second vehicle 102 is going to move to the second lane L2, the processor 850 may determine that the second lane L2 has the highest risk level.

In the example of FIG. 14, when the vehicle 100 is determined, based on vehicle state information, to move to the third lane L3 and the third vehicle 103 is determined, based on V2V data provided by the third vehicle 103, to move to the third lane L3, the processor 850 may determine that the third lane L3 has the highest risk level.

In the example of FIG. 14, when the vehicle 100 is determined, based on vehicle state information, to move to the first lane L1 and a speed of the fourth vehicle 104 is determined to increase gradually, the processor 850 may determine that the first lane L1 has the highest risk level.

According to another embodiment of the present invention, the processor 850 may determine a risk level for a lane of interest, using driving record of a vehicle of interest.

Data of interest may include information about the driving record of the vehicle of interest.

Information about the driving record may include a previous path travelled by the vehicle of interest, and information about a speed at which the vehicle of interest previously travelled in each area.

Based on the information about the driving record of the vehicle of interest, the processor 850 may determine a risk level for the vehicle of interest.

For example, based on driving record of a vehicle of interest, the processor 850 may determine a speed of the vehicle of interest in a specific area, the number of times that the vehicle of interest makes a lane change in the specific area, and the number of times that the vehicle of interest overtakes other vehicle in the specific area. The processor 850 may determine that a risk level for the vehicle of interest is proportional to at least one of the speed of the vehicle of interest in the specific area, the number of times that the vehicle of interest makes a lane change in the specific area, and the number of times that the vehicle of interest overtakes other vehicle in the specific area. Accordingly, the processor 850 may determine that the vehicle of interest has a high risk level when at least one of the speed of the vehicle of interest in the specific area, the number of times that the vehicle of interest makes a lane change in the specific area, and the number of times that the vehicle of interest overtakes other vehicle in the specific area is same or greater than a preset value.

The processor 850 may determine that a risk level for a lane in which the vehicle of interest is located is proportional to a risk level for the vehicle of interest.

For example, when the vehicle of interest has the highest risk level, the processor 850 may determine that a lane in which the vehicle of interest is located has the highest risk level. In this case, the processor 850 may determine that lanes on both sides of the lane in which the vehicle of interest is located have a normal risk level.

In the example of FIG. 14, when it is determined that the second vehicle 102 has the highest risk level, the processor 850 may determine that the third lane L2 has the highest risk level of 2, that the second lane L2 and the fourth lane L4 have a risk level of 1, and that the first lane L1 has a risk level of 0.

According to another embodiment of the present invention, the processor 850 may determine a recommended speed for each lane, by taking into consideration a speed of the vehicle 100.

Data of interest may include information about a speed of the vehicle of interest. Accordingly, the processor 850 may determine a speed of the vehicle of interest based on data of interest.

The processor 850 may determine that a speed of the vehicle of interest determined based on speed information of the vehicle of interest is a recommended speed for a lane in which the vehicle of interest is located.

In the example of FIG. 14, the first vehicle 101, the second vehicle 102, the third vehicle 103, and the fourth vehicle 104 are located on a road corresponding to a set path for the vehicle 100, and therefore, they are all vehicles of interest. Accordingly, V2V data respectively provided by the first vehicle 101, the second vehicle 102, the third vehicle 103, and the fourth vehicle 104 are data of interest.

The processor 850 may determine a speed of each of the first vehicle 101, the second vehicle 102, the third vehicle 103, and the fourth vehicle 104, based on data of interest provided by each of them.

The processor 850 may determine that a speed of the first vehicle 101 is a recommended speed for the second lane L2. The processor 850 may determine that a speed of the second vehicle 102 is a recommended speed for the third lane L3. The processor 850 may determine that a speed of the third vehicle 103 is a recommended speed for the fourth lane L4. The processor 850 may determine that a speed of the fourth lane 104 is a recommended speed for the first lane L1.

When a recommended speed for a lane included in a set path is determined, the processor 850 may display the recommended speed on the display unit 251.

When the vehicle 100 is in an autonomous mode, the processor 850 may provide a control signal so that the vehicle 100 travels at the recommend speed for the current lane of travel.

When it is determined, based on data of interest, that there is a lane in which no other vehicle is located among multiple lanes included in the set path, the processor 850 may determine a legal top speed limit corresponding to the set path to be a recommended speed for the lane in which no other vehicle is located.

The legal top speed limit corresponding to the set path is a legal top speed limit for a road corresponding to the set path. Based on navigation information or traffic information, the processor 850 may determine a legal top speed limit corresponding to the set path.

Figure 15:
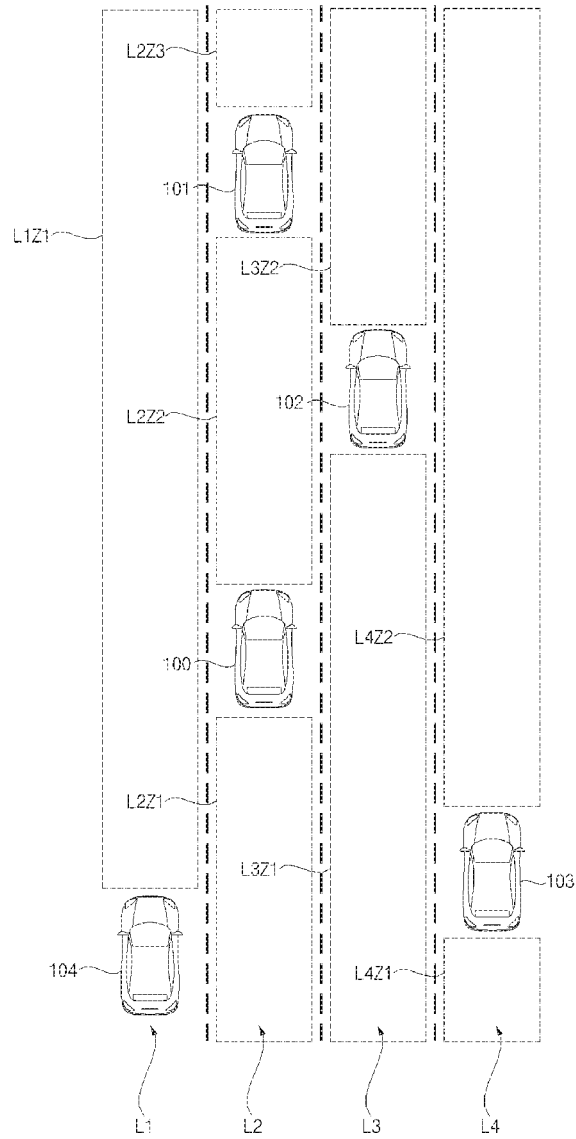
FIG. 15 is a diagram illustrating a driving assistance apparatus according to an embodiment of the present invention determines distribution of risk levels over multiple lanes.

FIG. 15 is a diagram illustrating a driving assistance apparatus according to an embodiment of the present invention determines distribution of risk levels over multiple lanes.

The processor 850 may determine respective recommended speeds or risk levels for multiple lanes L1, L2, L3, and L4 included in a set path. In addition, with reference to the vehicles 100, 101, 102, 103, and 104 located in the multiple lanes L1, L2, L3, and L4, the processor 850 may divide the multiple lanes L1, L2, L3, and L4 into multiple regions L1Z1, L2Z1, L2Z2, L2Z3, L3Z1, L3Z2, L4Z1, and L4Z2. The processor 850 may determine a recommended speed or risk level for each of the multiple regions L1Z1, L2Z1, L2Z2, L2Z3, L3Z1, L3Z2, L4Z1, and L4Z2.

When the fourth vehicle 104 is determined to be located in the first lane L1, the processor 850 may divide the first lane L1 into multiple regions with reference to the fourth vehicle 104. Although only the front region L1Z1 of the fourth vehicle 104 is shown in the example of FIG. 15, a rear region of the fourth vehicle 104 may exist. The processor 850 may determine a risk level for the region L1Z1 based on V2V data respectively provided by the fourth vehicle 104 and the first vehicle 101. The processor 850 may determine a recommended speed for the region L1Z1 based on V2V data provided by the fourth vehicle 104.

When the vehicle 100 and the first vehicle 101 are determined to be located in the second lane L2, the processor 850 may divide the second lane L2 into a region L2Z1 behind the vehicle 100, a region L2Z2 between the vehicle 100 and the first vehicle 101, and a region L2Z3 in front of the first vehicle. The processor 850 may determine a risk level for the region L2Z1 based on V2V data provided by the fourth vehicle 104. The processor 850 may determine a risk level for the region L2Z2 based on V2V data respectively provided by the second vehicle 102 and the first vehicle 101. The processor 850 may determine a risk level for the region L2Z3 or a recommended speed for the second lane L2 based on V2V data provided by the first vehicle 101.

When the second vehicle 102 is determined to be located in the third lane L3, the processor 850 may divide the third lane L3 into a region L3Z1 behind the second vehicle 102 and a region L3Z2 in front of the second vehicle 102. The processor 850 may determine a risk level for the region L3Z1 based on V2V data respectively provided by the third vehicle 103 and the second vehicle 102. The processor 850 may determine a risk level for the region L3Z2 based on V2V data respectively provided by the second vehicle 102 and the first vehicle 101. The processor 850 may determine a recommended speed for the third lane L3, based on V2V data provided by the second vehicle 102.

When the third vehicle 103 is determined to be located in the fourth lane L4, the processor 850 may divide the fourth lane L4 into a region L4Z1 behind the third vehicle 103 and a region L4Z2 in front of the third vehicle 103. The processor 850 may determine a risk level for the region L4Z1, based on V2V data provided by the third vehicle 103. The processor 850 may determine a risk level for the region L4Z2, based on V2V data respectively provided by the third vehicle 103 and the second vehicle 102. The processor 850 may determine a recommended speed for the fourth lane L4, based on V2V data provided by the third vehicle 103.

FIGS. 16 and 17 are diagrams illustrating a driving assistance apparatus according to an embodiment of the present invention sets a recommended path necessary for a lane change.

Based on information about a set path for the vehicle 100 and vehicle state information, the processor 850 may determine whether the vehicle 100 needs to change a lane.

For example, the processor 850 may determine the current lane of travel in which the vehicle 100 is located, based on GPS location information and surrounding image information of the vehicle 100 included in vehicle state information. Then, when it is determined, based on information about a set path and a location of the current lane of travel, that the vehicle 100 needs to make a lane change in order to travel along the set path, the processor 850 may determine that the vehicle 100 needs to change a lane.

For example, based on the vehicle state information, the processor 850 may determine whether a turn signal light of the vehicle 100 is turned on. When the turn signal light of the vehicle 100 is turned on, the processor 850 may determine, based on surrounding situation information, whether there is a lane for the vehicle 100 to move in a direction corresponding to a direction indicated by the turn signal light. When there is a lane for the vehicle 100 to move in the direction corresponding to the direction indicated by the turn signal light, the processor 850 may determine to make a lane change in the direction indicated by the turn signal light.

When it is determined that the vehicle 100 needs to make a lane change, the processor 850 may determine, based on data of interest and vehicle state information, a timing for lane change (hereinafter, referred to as a "lane change timing").

For example, the processor 850 may predict a path and a location of a vehicle of interest based on data of interest. Based on the predicted path and location of the vehicle of interest, the processor 850 may determine a lane change timing at which a lane change would not lead to a collision between the vehicle and the vehicle of interest.

The processor 850 may set a path, along which the vehicle 100 is able to make a lane change at the determined timing, as a recommended path.

In the examples of FIGS. 16 and 17, the driving assistance apparatus 800 may determine a lane change timing depending on a driving mode of the vehicle 100.

Figure 16A:
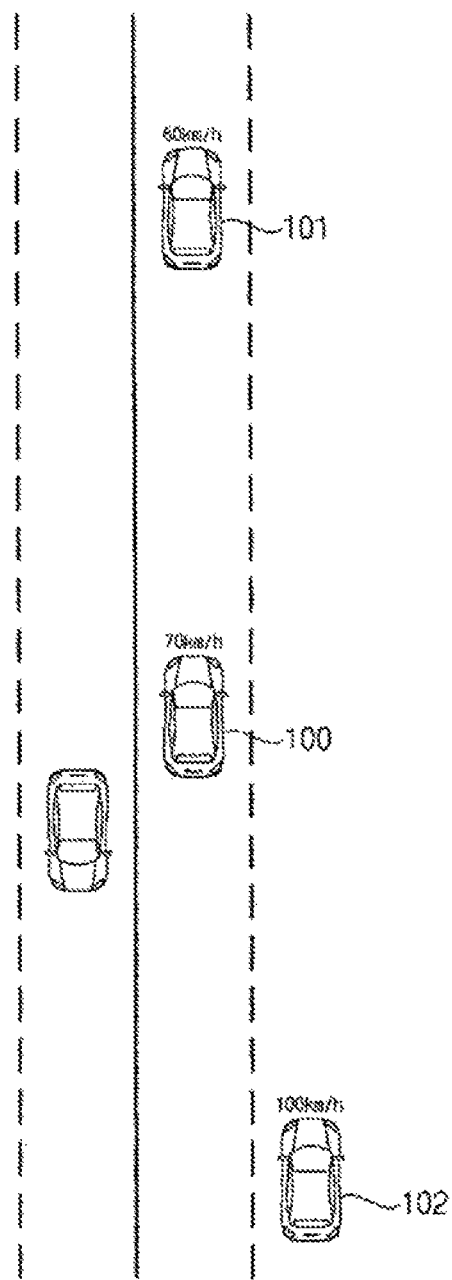
FIGS. 16A, 16B, 16C, 17A, 17B, 17C are diagrams illustrating a driving assistance apparatus according to an embodiment of the present invention sets a recommended path necessary for a lane change.
Figure 16B:
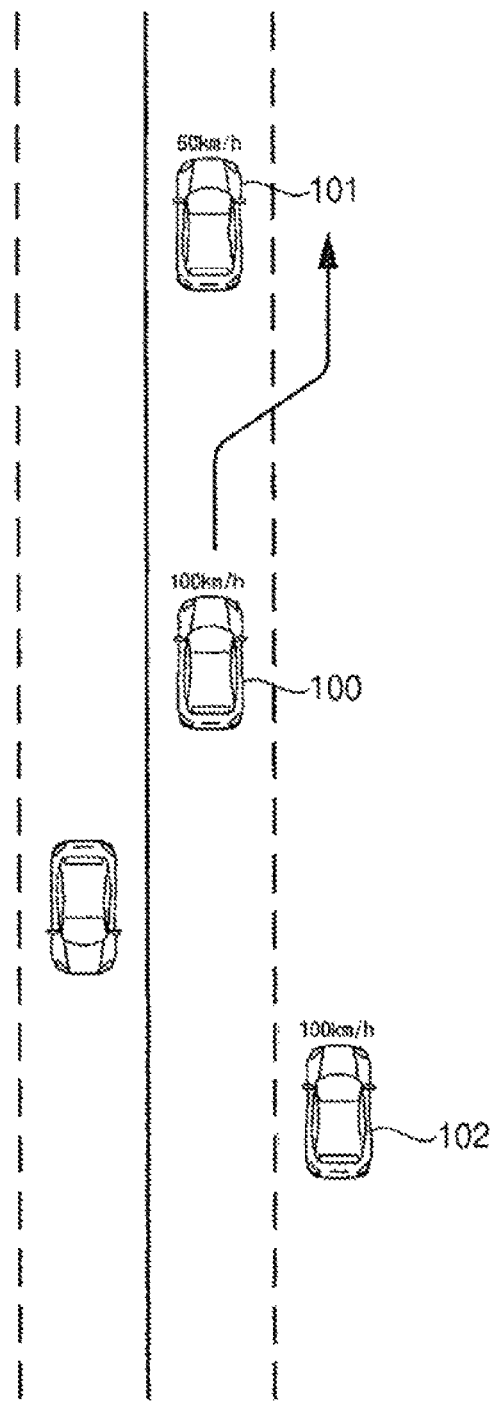
Figure 16C:
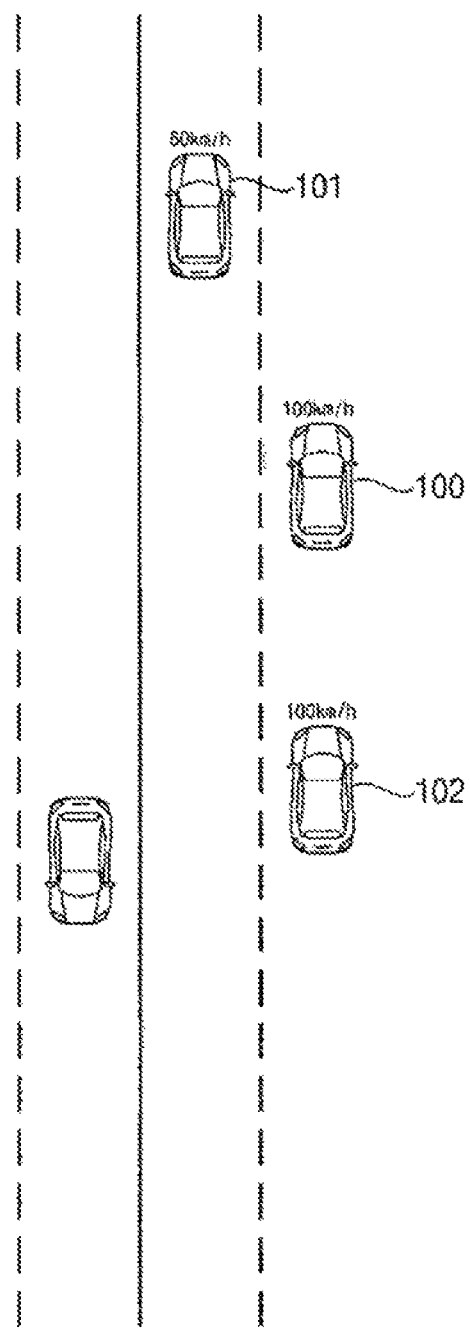

Referring to FIGS. 16A, 16B, 16C, when the vehicle 100 is determined to be in a speed mode based on vehicle state information, the processor 850 may determine a relatively early lane change timing.

If it is determined, based on a distance between the vehicle 100 and the second vehicle 102, the vehicle 100 is allowed to make a lane change in front of a second vehicle 102 while the second vehicle 102 is travelling at 100 km/h in a lane to which the vehicle 100 is going to move, the processor 850 may adjust a speed of the vehicle 100 to 100 km/h.

The processor 850 may set a path, along which the vehicle 100 accelerates to 100 km/h and then make a lane change in front of the second vehicle 102, as a recommended path.

When the vehicle 100 is in the manual mode, the processor 850 may display, on the display unit 251, a message which indicates acceleration of up to 100 km and a recommended path for making a lane change in front of the second vehicle 102.

When the vehicle 100 is in the autonomous mode, the processor 850 may control the vehicle 100 to travel along the recommended path. The processor 850 may perform a control action such that the vehicle 100 accelerates up to 100 km/h and then makes a lane change in front of the second vehicle 102.

Figure 17A:
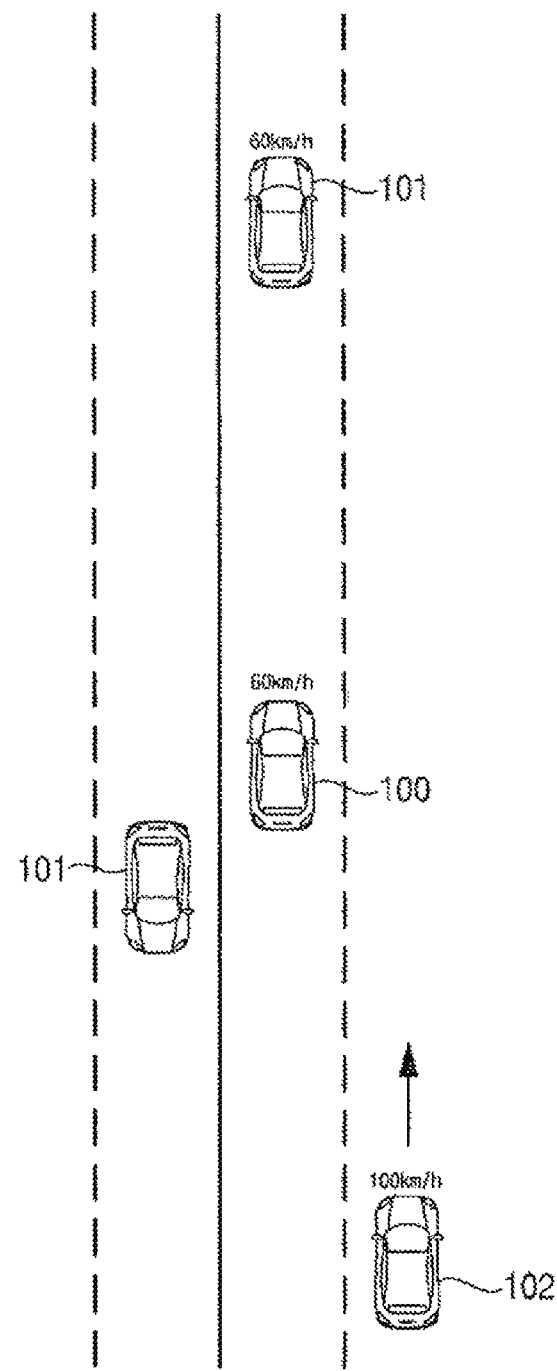
Figure 17B:
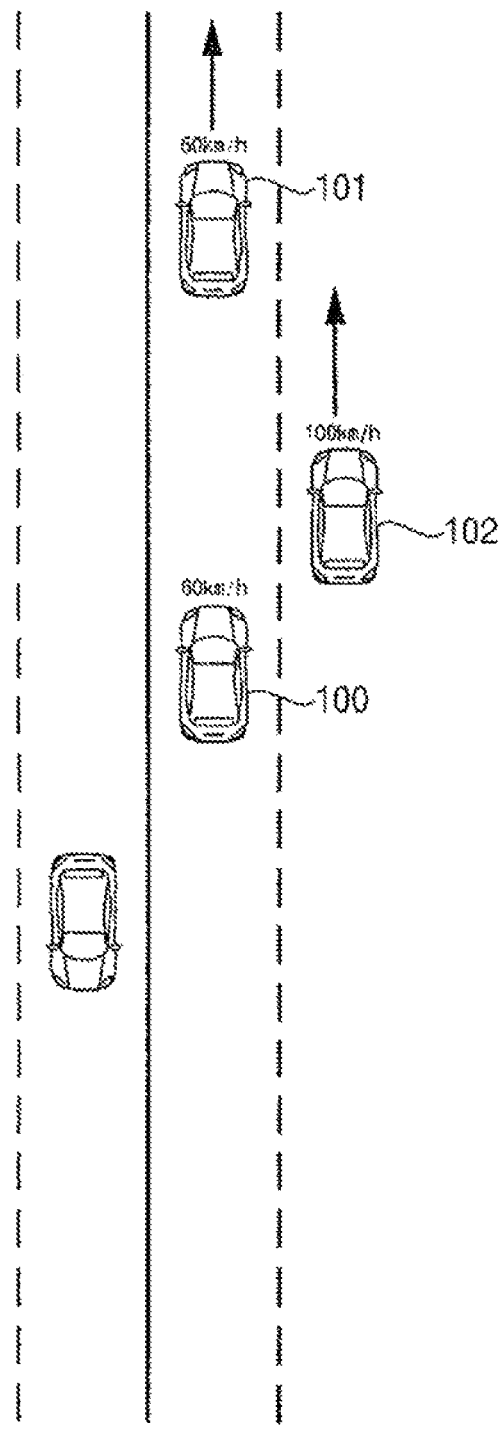
Figure 17C:
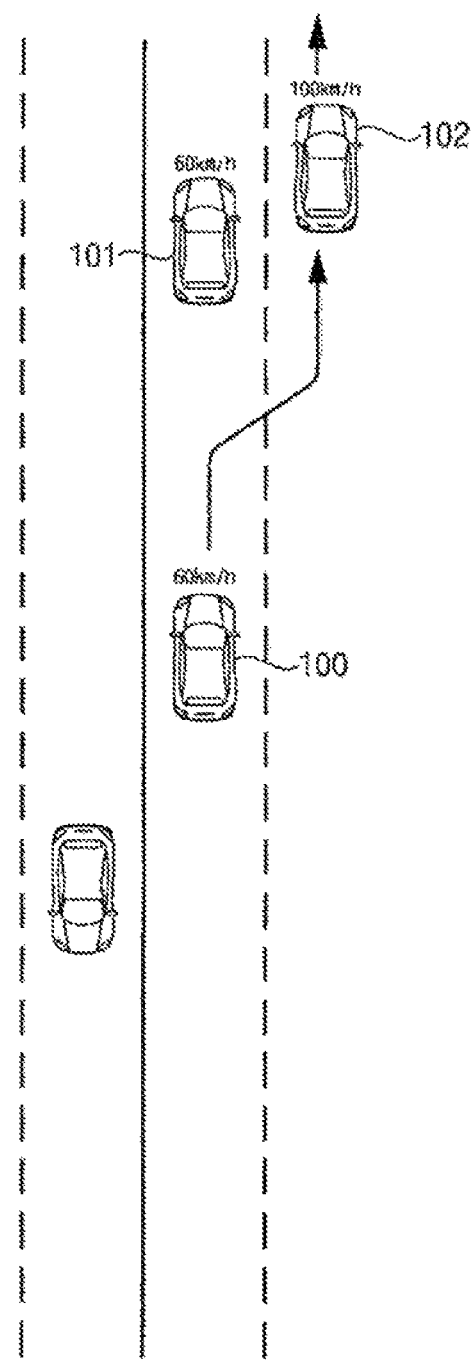

Referring to FIGS. 17A, 17B, 17C, when the vehicle 100 is determined in a safe mode based on vehicle state information, the processor 850 may determine a relatively late lane change timing.

Even in the case where it is determined, based on a distance between the vehicle 100 and a second vehicle 102, the vehicle is able to make a lane change in front of the second vehicle 102 while the second vehicle 102 is travelling at 100 km/h in a lane to which the vehicle 100 is going to move, the processor 850 may determine a lane change timing at which the vehicle 100 would make a lane change after the second vehicle 102 passes.

The processor 850 may set a path, along which the vehicle 100 would make a lane change after the second vehicle 102 passes, as a recommended path.

When the vehicle 100 is in the manual mode, the processor 850 may display, on the display unit 251, a recommended path for making a lane change after the second vehicle 102 passes.

When the vehicle 100 is in the autonomous mode, the processor 850 may control the vehicle 100 to travel along the recommended path. The processor 850 may control the vehicle 100 to make a lane change after the second vehicle 102 passes.

Based on data of interest, the processor 850 may further determine a recommended speed for a lane to which the vehicle 100 is going to move.

The processor 850 may display, on the display unit 251, the recommended speed for the lane to which the vehicle 100 is going to move.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A driving assistance apparatus for a first vehicle, the apparatus comprising:
   an interface configured to provide vehicle state information indicating a state of one or more devices in the first vehicle; and
   a processor configured to:
      acquire information, generated by a navigation system through the interface, about a set path with road-level precision for the first vehicle;
      receive, via a communication apparatus, first data from one or more other vehicles;
      identify data of interest from among the first data based on the information about the set path, wherein the data of interest is received from a second vehicle that is located within the set path of the first vehicle; and
      identify a recommended path for the first vehicle based on the data of interest,
   wherein the vehicle state information comprises road-level GPS location information of the first vehicle and first image information acquired by a camera located at the first vehicle,
   wherein the data of interest from the second vehicle comprises road-level GPS location information of the second vehicle and second image information of an area proximate to an outside of the second vehicle,
   wherein the processor is further configured to:
      determine a lane-level location of the second vehicle based on the road-level GPS location information of the second vehicle that provides a road-level location of the second vehicle and the second image information that includes surrounding image information;
      determine a lane-level location of the first vehicle based on the road-level GPS location information of the first vehicle that provides a road-level location of the first vehicle and the first image information that includes surrounding image information;
      determine a recommended speed or risk level for a current lane in which the second vehicle is located, based on the lane-level location of the second vehicle and the lane-level location of the first vehicle; and identify the recommended path with lane-level precision further based on the recommended speed or risk level for the current lane of the second vehicle, wherein the recommended path with lane-level precision is more detailed than the set path with road-level precision and is used to identify a lane of a road included in the recommended path.

2. The driving assistance apparatus according to claim 1, wherein the interface is further configured to provide situation information which indicates an environment or situation proximate to the first vehicle, and wherein the processor is further configured to:
when the situation information indicates that a road corresponding to the set path is a multilane road, determine a recommended speed or risk level for each lane of the multilane road, based on the lane-level location of the second vehicle and the lane-level location of the first vehicle; and identify the recommended path further based on the recommended speed or risk level for each lane of the multilane road.

3. The driving assistance apparatus according to claim 2, wherein the vehicle state information comprises speed information of the first vehicle, wherein the data of interest comprises speed information of the second vehicle, and wherein the processor is further configured to determine the risk level for each lane of the multilane road, based on the lane-level location of the second vehicle, the lane-level location of the first vehicle, the speed information of the first vehicle, and the speed information of the second vehicle.

4. The driving assistance apparatus according to claim 3, wherein the processor is further configured to:
when it is determined that the second vehicle is located behind the first vehicle, determine the risk level for a lane in which the second vehicle is located as being proportional to a value obtained by subtracting a speed of the first vehicle from a speed of the second vehicle; and when it is determined that the second vehicle is located ahead of the first vehicle, determine that the risk level for the lane in which the second vehicle is located as being proportional to a value obtained by subtracting the speed of the second vehicle from the speed of the first vehicle.

5. The driving assistance apparatus according to claim 2, wherein the vehicle state information comprises first information which relates to the set path and a control state of the first vehicle, wherein the data of interest comprises second information which relates to a set path and a control state of the second vehicle, and wherein the processor is further configured to determine the risk level for each lane of the multilane road based on the lane-level location of the second vehicle, the lane-level location of the first vehicle, the first information, and the second information.

6. The driving assistance apparatus according to claim 2, wherein the data of interest comprises information about a driving record of the second vehicle, and wherein the processor is further configured to:
determine a risk level for the second vehicle based on the driving record of the second vehicle; and determine that the risk level for a lane in which the second vehicle is located as being proportional to the risk level for the second vehicle.

7. The driving assistance apparatus according to claim 2, wherein the data of interest comprises speed information of the second vehicle, and wherein the processor is further configured to determine that a speed of the second vehicle is a recommended speed for a lane in which the second vehicle is located, and wherein the speed of the second vehicle is determined based on the speed information of the second vehicle.

8. The driving assistance apparatus according to claim 7, wherein the processor is further configured to:
when it is determined, based on the data of interest, that there is a lane of the multilane road in which the second vehicle is not present, determine that a legal top speed limit corresponding to the set path is a recommended speed for the lane in which the second vehicle is not present.

9. The driving assistance apparatus according to claim 2, wherein the vehicle state information comprises information about a driving mode of the first vehicle, and wherein the processor is further configured to:
when it is determined, based on the vehicle state information, that the driving mode of the first vehicle is a speed mode, identify the recommended path further as begin a path along which the first vehicle is to move to a lane among the lanes of the multilane road, wherein the lane that the first vehicle is to move to is a lane having a highest recommended speed.

10. The driving assistance apparatus according to claim 2, wherein the vehicle state information comprises information about a driving mode of the first vehicle, and wherein the processor is further configured to:
when it is determined, based on the vehicle state information, the driving mode of the first vehicle is a safe mode, identify the recommended path further as begin a path along which the first vehicle is to move to a lane among the lanes of the multilane road, wherein the lane that the first vehicle is to move to is a lane having a lowest risk.

11. The driving assistance apparatus according to claim 1, wherein the processor is further configured to filter out data other than the data of interest from the first data.

12. The driving assistance apparatus according to claim 1, further comprising:
an interface configured to transmit vehicle state information, wherein the processor is further configured to:
when it is determined, that the first vehicle is to make a lane change, based on the information about the set path and the vehicle state information, determine lane change timing for the first vehicle based on the data of interest and the vehicle state information; and identify the recommended path as being a path along which the first vehicle is able to make the lane change at the determined lane change timing.

13. The driving assistance apparatus according to claim 12, further comprising:
a display, and wherein the processor is further configured to:
determine a recommended speed for a lane to which the first vehicle is going to move, based on the data of interest; and cause the display to display the recommended speed on the display.

14. The driving assistance apparatus according to claim 1, further comprising:
a display, and
wherein the processor is further configured to:
cause the display to display the recommended path on the display.

15. The driving assistance apparatus according to claim 1, wherein the communication unit is configured to communicate with an external device using a vehicle-to-everything (V2X) communication and to communicate with the one or more other vehicles using vehicle to vehicle (V2V) communication,
wherein the first data is received via the V2V communication, and
wherein the first data is received directly from the one or more other vehicles.

16. A control method of a driving assistance apparatus for a first vehicle, the method comprising:
acquiring information about a set path with road-level precision for the first vehicle;
receiving first data from one or more other vehicles;
identifying data of interest from among the first data based on the information about the set path, wherein the data of interest is received from a second vehicle that is located within the set path of the first vehicle;
determining a lane-level location of the second vehicle based on road-level GPS location information that provides a road-level location of the second vehicle and surrounding image information included in the data of interest;
determining a lane-level location of the first vehicle based on road-level GPS location information that provides a road-level location of the first vehicle and surrounding image information included in vehicle state information for the first vehicle;
determining a recommended speed or risk level for one or more lanes included in a road which corresponds to the set path, based on the lane-level location of the second vehicle and the lane-level location of the first vehicle; and
identifying a recommended path with lane-level precision, based on the recommended speed or risk level for the one or more lanes, wherein the recommended path with lane-level precision is more detailed than the set path with road-level precision and is used to identify a lane of a road included in the recommended path.

* * * * *